(12) United States Patent
Bellegarda

(10) Patent No.: US 9,431,006 B2
(45) Date of Patent: Aug. 30, 2016

(54) METHODS AND APPARATUSES FOR AUTOMATIC SPEECH RECOGNITION

(75) Inventor: Jerome R. Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1947 days.

(21) Appl. No.: 12/497,511

(22) Filed: Jul. 2, 2009

(65) Prior Publication Data

US 2011/0004475 A1     Jan. 6, 2011

(51) Int. Cl.
| | | |
|---|---|---|
| *G10L 15/08* | (2006.01) | |
| *G10L 15/32* | (2013.01) | |
| G10L 15/187 | (2013.01) | |

(52) U.S. Cl.
CPC .................. *G10L 15/08* (2013.01); *G10L 15/32* (2013.01); *G10L 15/187* (2013.01)

(58) Field of Classification Search
CPC ......... G10L 15/04; G10L 15/08; G10L 15/32; G10L 15/187
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

International Preliminary Report on Patentability received for PCT Patent Application No. PCT/US2012/029810, mailed on Oct. 3, 2013, 9 pages.

(Continued)

*Primary Examiner* — Angela A Armstrong
(74) *Attorney, Agent, or Firm* — Morrison & Foerster LLP

(57) ABSTRACT

Exemplary embodiments of methods and apparatuses for automatic speech recognition are described. First model parameters associated with a first representation of an input signal are generated. The first representation of the input signal is a discrete parameter representation. Second model parameters associated with a second representation of the input signal are generated. The second representation of the input signal includes a continuous parameter representation of residuals of the input signal. The first representation of the input signal includes discrete parameters representing first portions of the input signal. The second representation includes discrete parameters representing second portions of the input signal that are smaller than the first portions. Third model parameters are generated to couple the first representation of the input signal with the second representation of the input signal. The first representation and the second representation of the input signal are mapped into a vector space.

33 Claims, 17 Drawing Sheets

(56) References Cited

U.S. PATENT DOCUMENTS

| | | |
|---|---|---|
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,829,583 A | 5/1989 | Monroe et al. |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| 5,289,562 A * | 2/1994 | Mizuta et al. ................. 704/200 |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,500,905 A | 3/1996 | Martin et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,555,343 A | 9/1996 | Luther |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,649,060 A | 7/1997 | Ellozy et al. |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,742,705 A | 4/1998 | Parthasarathy |
| 5,748,974 A | 5/1998 | Johnson |
| 5,749,081 A | 5/1998 | Whiteis |
| 5,757,979 A | 5/1998 | Hongo et al. |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |

(56) References Cited

U.S. PATENT DOCUMENTS

| | | |
|---|---|---|
| 5,794,237 A | 8/1998 | Gore, Jr. |
| 5,799,276 A | 8/1998 | Komissarchik et al. |
| 5,812,697 A | 9/1998 | Sakai et al. |
| 5,812,698 A | 9/1998 | Platt et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,909,666 A | 6/1999 | Gould et al. |
| 5,913,193 A | 6/1999 | Huang et al. |
| 5,915,236 A | 6/1999 | Gould et al. |
| 5,915,249 A | 6/1999 | Spencer |
| 5,920,836 A | 7/1999 | Gould et al. |
| 5,920,837 A | 7/1999 | Gould et al. |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,983,179 A | 11/1999 | Gould |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,991,441 A | 11/1999 | Jourjine |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,959 A | 5/2000 | Young et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,073,097 A | 6/2000 | Gould et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,092,043 A | 7/2000 | Squires et al. |
| 6,094,649 A | 7/2000 | Bowen et al. |
| 6,101,468 A | 8/2000 | Gould et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,177,905 B1 | 1/2001 | Welch |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,259,826 B1 | 7/2001 | Pollard et al. |
| 6,260,011 B1 | 7/2001 | Heckerman et al. |
| 6,260,013 B1 | 7/2001 | Sejnoha |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,282,507 B1 | 8/2001 | Horiguchi et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,397,186 B1 | 5/2002 | Bush et al. |
| 6,421,672 B1 | 7/2002 | McAllister et al. |
| 6,434,522 B1* | 8/2002 | Tsuboka ..................... 704/256 |
| 6,434,524 B1 | 8/2002 | Weber |
| 6,442,518 B1 | 8/2002 | Van Thong et al. |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,489,951 B1 | 12/2002 | Wong et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,022 B2 | 7/2003 | Yuschik |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,622,121 B1 | 9/2003 | Crepy et al. |
| 6,622,136 B2 | 9/2003 | Russell |

(56) References Cited

U.S. PATENT DOCUMENTS

| | | |
|---|---|---|
| 6,625,583 B1 | 9/2003 | Silverman et al. |
| 6,628,808 B1 | 9/2003 | Bach et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,680,675 B1 | 1/2004 | Suzuki |
| 6,684,187 B1 | 1/2004 | Conkie |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,839,464 B2 | 1/2005 | Hawkins et al. |
| 6,839,669 B1 | 1/2005 | Gould et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,865,533 B2 | 3/2005 | Addison et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,498 B2 | 6/2005 | Stevens et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,957,076 B2 | 10/2005 | Hunzinger |
| 6,960,734 B1 | 11/2005 | Park |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,084,758 B1 | 8/2006 | Cole |
| 7,085,723 B2 | 8/2006 | Ross et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,107,204 B1 | 9/2006 | Liu et al. |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,228,278 B2 | 6/2007 | Nguyen et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,269,556 B2 | 9/2007 | Kiss et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,315,818 B2 | 1/2008 | Stevens et al. |
| 7,324,947 B2 | 1/2008 | Jordan et al. |
| 7,349,953 B2 | 3/2008 | Lisitsa et al. |
| 7,362,738 B2 | 4/2008 | Taube et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,460,652 B2 | 12/2008 | Chang |
| 7,467,087 B1 | 12/2008 | Gillick et al. |
| 7,475,010 B2 | 1/2009 | Chao |
| 7,483,832 B2 | 1/2009 | Tischer |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,528,713 B2 | 5/2009 | Singh et al. |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,577,522 B2 | 8/2009 | Rosenberg |
| 7,580,551 B1 | 8/2009 | Srihari et al. |
| 7,599,918 B2 | 10/2009 | Shen et al. |
| 7,603,381 B2 | 10/2009 | Burke et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |

(56) References Cited

U.S. PATENT DOCUMENTS

| | | | |
|---|---|---|---|
| 7,649,454 B2 | 1/2010 | Singh et al. |
| 7,657,424 B2 | 2/2010 | Bennett |
| 7,664,638 B2 | 2/2010 | Cooper et al. |
| 7,672,841 B2 | 3/2010 | Bennett |
| 7,676,026 B1 | 3/2010 | Baxter, Jr. |
| 7,684,985 B2 | 3/2010 | Dominach et al. |
| 7,684,990 B2 | 3/2010 | Caskey et al. |
| 7,693,715 B2 | 4/2010 | Hwang et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longé et al. |
| 7,885,844 B1 | 2/2011 | Cohen et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,930,197 B2 | 4/2011 | Ozzie et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 7,999,669 B2 | 8/2011 | Singh et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,050,500 B1 | 11/2011 | Batty et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,138,912 B2 | 3/2012 | Singh et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,188,856 B2 | 5/2012 | Singh et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,498,857 B2 | 7/2013 | Kopparapu et al. |
| 2001/0047264 A1 | 11/2001 | Roundtree |
| 2002/0002461 A1 | 1/2002 | Tetsumoto |
| 2002/0010584 A1 | 1/2002 | Schultz et al. |
| 2002/0031262 A1 | 3/2002 | Imagawa et al. |
| 2002/0032564 A1 | 3/2002 | Ehsani et al. |
| 2002/0035474 A1 | 3/2002 | Alpdemir |
| 2002/0042707 A1 | 4/2002 | Zhao et al. |
| 2002/0046025 A1 | 4/2002 | Hain |
| 2002/0059068 A1* | 5/2002 | Rose et al. ............ 704/246 |
| 2002/0067308 A1 | 6/2002 | Robertson |
| 2002/0069063 A1 | 6/2002 | Buchner et al. |
| 2002/0077817 A1 | 6/2002 | Atal |
| 2002/0099552 A1 | 7/2002 | Rubin et al. |
| 2002/0103641 A1 | 8/2002 | Kuo et al. |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0128827 A1 | 9/2002 | Bu et al. |
| 2002/0133347 A1 | 9/2002 | Schoneburg et al. |
| 2002/0135565 A1 | 9/2002 | Gordon et al. |
| 2002/0138265 A1 | 9/2002 | Stevens et al. |
| 2002/0143551 A1 | 10/2002 | Sharma et al. |
| 2002/0154160 A1 | 10/2002 | Hosokawa |
| 2002/0164000 A1 | 11/2002 | Cohen et al. |
| 2002/0198714 A1 | 12/2002 | Zhou |
| 2003/0078766 A1 | 4/2003 | Appelt et al. |
| 2003/0088414 A1 | 5/2003 | Huang et al. |
| 2003/0097210 A1 | 5/2003 | Horst et al. |
| 2003/0099335 A1 | 5/2003 | Tanaka et al. |
| 2003/0135740 A1 | 7/2003 | Talmor et al. |
| 2003/0167335 A1 | 9/2003 | Alexander |
| 2003/0190074 A1 | 10/2003 | Loudon et al. |
| 2003/0233230 A1 | 12/2003 | Ammicht et al. |
| 2003/0234824 A1 | 12/2003 | Litwiller |
| 2004/0085162 A1 | 5/2004 | Agarwal et al. |
| 2004/0135701 A1 | 7/2004 | Yasuda et al. |
| 2004/0145607 A1 | 7/2004 | Alderson |
| 2004/0186714 A1 | 9/2004 | Baker |
| 2004/0199387 A1 | 10/2004 | Wang et al. |

(56) References Cited

U.S. PATENT DOCUMENTS

| | | |
|---|---|---|
| 2004/0220798 A1 | 11/2004 | Chi et al. |
| 2004/0236778 A1 | 11/2004 | Junqua et al. |
| 2005/0002507 A1 | 1/2005 | Timmins et al. |
| 2005/0015772 A1 | 1/2005 | Saare et al. |
| 2005/0021330 A1* | 1/2005 | Mano .................... 704/231 |
| 2005/0033582 A1 | 2/2005 | Gadd et al. |
| 2005/0045373 A1 | 3/2005 | Born |
| 2005/0049880 A1 | 3/2005 | Roth et al. |
| 2005/0055403 A1 | 3/2005 | Brittan |
| 2005/0058438 A1 | 3/2005 | Hayashi |
| 2005/0071332 A1 | 3/2005 | Ortega et al. |
| 2005/0080625 A1 | 4/2005 | Bennett et al. |
| 2005/0086059 A1 | 4/2005 | Bennett |
| 2005/0091118 A1 | 4/2005 | Fano |
| 2005/0100214 A1 | 5/2005 | Zhang et al. |
| 2005/0102614 A1 | 5/2005 | Brockett et al. |
| 2005/0108001 A1 | 5/2005 | Aarskog |
| 2005/0108074 A1 | 5/2005 | Bloechl et al. |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0152602 A1 | 7/2005 | Chen et al. |
| 2005/0165607 A1 | 7/2005 | DiFabbrizio et al. |
| 2005/0182628 A1 | 8/2005 | Choi |
| 2005/0182629 A1 | 8/2005 | Coorman et al. |
| 2005/0192801 A1 | 9/2005 | Lewis et al. |
| 2005/0196733 A1 | 9/2005 | Budra et al. |
| 2005/0203747 A1 | 9/2005 | Lecoeuche |
| 2005/0203991 A1 | 9/2005 | Kawamura et al. |
| 2005/0228665 A1 | 10/2005 | Kobayashi et al. |
| 2005/0273626 A1 | 12/2005 | Pearson et al. |
| 2005/0288936 A1 | 12/2005 | Busayapongchai et al. |
| 2005/0289463 A1 | 12/2005 | Wu et al. |
| 2006/0009973 A1 | 1/2006 | Nguyen et al. |
| 2006/0018492 A1 | 1/2006 | Chiu et al. |
| 2006/0061488 A1 | 3/2006 | Dunton |
| 2006/0095848 A1 | 5/2006 | Naik |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0235700 A1 | 10/2006 | Wong et al. |
| 2006/0293886 A1 | 12/2006 | Odell et al. |
| 2007/0006098 A1 | 1/2007 | Krumm et al. |
| 2007/0027732 A1 | 2/2007 | Hudgens |
| 2007/0038436 A1 | 2/2007 | Cristo et al. |
| 2007/0041361 A1 | 2/2007 | Iso-Sipila |
| 2007/0050191 A1 | 3/2007 | Weider et al. |
| 2007/0055525 A1 | 3/2007 | Kennewick et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0094026 A1 | 4/2007 | Ativanichayaphong et al. |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0118378 A1 | 5/2007 | Skuratovsky |
| 2007/0135949 A1 | 6/2007 | Snover et al. |
| 2007/0174188 A1 | 7/2007 | Fish |
| 2007/0185754 A1 | 8/2007 | Schmidt |
| 2007/0185917 A1 | 8/2007 | Prahlad et al. |
| 2007/0198269 A1 | 8/2007 | Braho et al. |
| 2007/0208569 A1 | 9/2007 | Subramanian et al. |
| 2007/0211071 A1 | 9/2007 | Slotznick et al. |
| 2007/0225980 A1 | 9/2007 | Sumita |
| 2007/0276651 A1 | 11/2007 | Bliss et al. |
| 2007/0276714 A1 | 11/2007 | Beringer |
| 2007/0282595 A1 | 12/2007 | Tunning et al. |
| 2008/0012950 A1 | 1/2008 | Lee et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0056579 A1 | 3/2008 | Guha |
| 2008/0077384 A1 | 3/2008 | Agapi et al. |
| 2008/0079566 A1 | 4/2008 | Singh et al. |
| 2008/0082332 A1 | 4/2008 | Mallett et al. |
| 2008/0082338 A1 | 4/2008 | O'Neil et al. |
| 2008/0082651 A1 | 4/2008 | Singh et al. |
| 2008/0120112 A1 | 5/2008 | Jordan et al. |
| 2008/0126100 A1 | 5/2008 | Grost et al. |
| 2008/0129520 A1 | 6/2008 | Lee |
| 2008/0131006 A1 | 6/2008 | Oliver |
| 2008/0140413 A1 | 6/2008 | Millman et al. |
| 2008/0140416 A1 | 6/2008 | Shostak |
| 2008/0140657 A1 | 6/2008 | Azvine et al. |
| 2008/0189114 A1 | 8/2008 | Fail et al. |
| 2008/0221903 A1 | 9/2008 | Kanevsky et al. |
| 2008/0228463 A1 | 9/2008 | Mori et al. |
| 2008/0228496 A1 | 9/2008 | Yu et al. |
| 2008/0240569 A1 | 10/2008 | Tonouchi |
| 2008/0247519 A1 | 10/2008 | Abella et al. |
| 2008/0249770 A1 | 10/2008 | Kim et al. |
| 2008/0256613 A1 | 10/2008 | Grover |
| 2008/0270118 A1 | 10/2008 | Kuo et al. |
| 2008/0281510 A1 | 11/2008 | Shahine |
| 2008/0300878 A1 | 12/2008 | Bennett |
| 2008/0313335 A1 | 12/2008 | Jung et al. |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0011709 A1 | 1/2009 | Akasaka et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0070097 A1 | 3/2009 | Wu et al. |
| 2009/0076792 A1 | 3/2009 | Lawson-Tancred |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112572 A1 | 4/2009 | Thorn |
| 2009/0112677 A1 | 4/2009 | Rhett |
| 2009/0123071 A1 | 5/2009 | Iwasaki |
| 2009/0125477 A1 | 5/2009 | Lu et al. |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0187577 A1 | 7/2009 | Reznik et al. |
| 2009/0191895 A1 | 7/2009 | Singh et al. |
| 2009/0204409 A1 | 8/2009 | Mozer et al. |
| 2009/0222488 A1 | 9/2009 | Boerries et al. |
| 2009/0239552 A1 | 9/2009 | Churchill et al. |
| 2009/0271109 A1 | 10/2009 | Lee et al. |
| 2009/0271175 A1 | 10/2009 | Bodin et al. |
| 2009/0271178 A1 | 10/2009 | Bodin et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0049514 A1 | 2/2010 | Kennewick et al. |
| 2010/0057457 A1 | 3/2010 | Ogata et al. |
| 2010/0070899 A1 | 3/2010 | Hunt et al. |
| 2010/0081456 A1 | 4/2010 | Singh et al. |
| 2010/0088020 A1 | 4/2010 | Sano et al. |
| 2010/0088100 A1 | 4/2010 | Lindahl |
| 2010/0131273 A1 | 5/2010 | Aley-Raz et al. |
| 2010/0138215 A1 | 6/2010 | Williams |
| 2010/0138416 A1 | 6/2010 | Bellotti |
| 2010/0145700 A1 | 6/2010 | Kennewick et al. |
| 2010/0146442 A1 | 6/2010 | Nagasaka et al. |
| 2010/0161554 A1 | 6/2010 | Datuashvili et al. |
| 2010/0204986 A1 | 8/2010 | Kennewick et al. |
| 2010/0217604 A1 | 8/2010 | Baldwin et al. |
| 2010/0223056 A1* | 9/2010 | Kadirkamanathan ......... 704/235 |

(56) References Cited

U.S. PATENT DOCUMENTS

| | | |
|---|---|---|
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0280983 A1 | 11/2010 | Cho et al. |
| 2010/0286985 A1 | 11/2010 | Kennewick et al. |
| 2010/0299133 A1 | 11/2010 | Kopparapu et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0324905 A1 | 12/2010 | Kurzweil et al. |
| 2010/0332235 A1 | 12/2010 | David |
| 2010/0332280 A1 | 12/2010 | Bradley et al. |
| 2010/0332348 A1 | 12/2010 | Cao |
| 2011/0047072 A1 | 2/2011 | Ciurea |
| 2011/0060807 A1 | 3/2011 | Martin et al. |
| 2011/0076994 A1 | 3/2011 | Kim et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0224972 A1 | 9/2011 | Millett et al. |
| 2011/0231182 A1 | 9/2011 | Weider et al. |
| 2011/0231188 A1 | 9/2011 | Kennewick et al. |
| 2011/0231474 A1 | 9/2011 | Locker et al. |
| 2011/0260861 A1 | 10/2011 | Singh et al. |
| 2011/0264643 A1 | 10/2011 | Cao |
| 2011/0279368 A1 | 11/2011 | Klein et al. |
| 2011/0288861 A1 | 11/2011 | Kurzweil et al. |
| 2011/0298585 A1 | 12/2011 | Barry |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0084086 A1 | 4/2012 | Gilbert et al. |
| 2012/0137367 A1 | 5/2012 | Dupont et al. |
| 2012/0149394 A1 | 6/2012 | Singh et al. |
| 2012/0173464 A1 | 7/2012 | Tur et al. |
| 2012/0197998 A1 | 8/2012 | Kessel et al. |
| 2012/0214517 A1 | 8/2012 | Singh et al. |
| 2012/0265528 A1 | 10/2012 | Gruber et al. |
| 2012/0271635 A1 | 10/2012 | Ljolje |
| 2012/0271676 A1 | 10/2012 | Aravamudan et al. |
| 2012/0310642 A1 | 12/2012 | Cao et al. |
| 2012/0310649 A1 | 12/2012 | Cannistraro et al. |
| 2012/0311583 A1 | 12/2012 | Gruber et al. |
| 2012/0330661 A1 | 12/2012 | Lindahl |
| 2013/0006638 A1 | 1/2013 | Lindahl |
| 2013/0110518 A1 | 5/2013 | Gruber et al. |
| 2013/0110520 A1 | 5/2013 | Cheyer et al. |
| 2013/0325443 A1 | 12/2013 | Begeja et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1229496 A2 | 8/2002 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 7-199379 A | 8/1995 |
| JP | 2001 125896 | 5/2001 |
| JP | 2002 024212 | 1/2002 |
| JP | 2003517158 A | 5/2003 |
| JP | 2004-152063 A | 5/2004 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10-2010-0119519 A | 11/2010 |
| KR | 10 2011 01134 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | 2010/075623 A1 | 7/2010 |
| WO | WO 2011/088053 A2 | 7/2011 |

OTHER PUBLICATIONS

"Interactive Voice", available online at <http://www.helloivee.com/company/>, retrieved from internet on Feb. 10, 2014, 2 pages.

"Meet Ivee Your Wi-Fi Voice Activated Assistant", available online at <http://www.helloivee.com/>, retrieved from internet on Feb. 10, 2014, 8 pages.

Anonymous, "Speaker Recognition", Wikipedia, The Free Enclyclopedia, Nov. 2, 2010, 4 pages.

Apple Computer, "Knowledge Navigator", available online at <http://www.youtube.com/watch?v=QRH8eimU_20>, Uploaded on Apr. 29, 2008, 7 pages.

Cheyer et al., "Demonstration Video of Multimodal Maps Using an Agent Architecture", available online at <http://www.youtube.com/watch?v=x3TptMGT9EQ&feature=youtu.be>, published on 1996, 6 pages.

Cheyer et al., "Demonstration Video of Multimodal Maps Using an Open- Agent Architecture", available online at <http://www.

(56) References Cited

OTHER PUBLICATIONS youtube.com/watch?v=JUxaKnyZyM&feature=youtu.be>, published on 1996, 6 pages.
Cheyer, Adam, "Demonstration Video of Vanguard Mobile Portal", available online at <http://www.youtube.com/watch?v=ZTMsvg_0oLQ&feature=youtu.be>, published on 2004, 10 pages.
Kickstarter, "Ivee Sleek: Wi-Fi Voice-Activated Assistant", available online at <https://www.kickstarter.com/discover/categories/hardware?ref=category> retrieved from internet on Feb. 10, 2014, 13 pages.
International Preliminary Report on Patentability received for PCT Patent Application No. PCT/US1993/012637, mailed on Apr. 10, 1995, 7 pages.
International Preliminary Report on Patentability received for PCT Patent Application No. PCT/US1993/012666, mailed on Mar. 1, 1995, 5 pages.
International Search Report received for PCT Patent Application No. PCT/US1993/012666, mailed on Nov. 9, 1994, 4 pages.
International Preliminary Report on Patentability received for PCT Patent Application No. PCT/US1994/011011, mailed on Feb. 28, 1996, 4 pages.
International Search Report received for PCT Patent Application No. PCT/US1994/011011, mailed on Feb. 8, 1995, 3 pages.
Written Opinion received for PCT Patent Application No. PCT/US1994/011011, mailed on Aug. 21, 1995, 4 pages.
International Preliminary Report on Patentability received for PCT Patent Application No. PCT/US1995/008369, mailed on Oct. 9, 1996, 4 pages.
International Search Report received for PCT Patent Application No. PCT/US1995/008369, mailed on Nov. 8, 1995, 2 pages.
International Search Report and Written Opinion received for PCT Patent Application No. PCT/US2012/029810, mailed on Aug. 17, 2012, 11 pages.
Wu, Min, "Speech Recognition, Synthesis, and H.C.I.", ENEE408G Capstone-Multimedia Signal Processing, Lecture-3, Course Presentation, Spring 2003, pp. 1-11.
Wyle, M. F., "A Wide Area Network Information Filter", In Proceedings of First International Conference on Artificial Intelligence Applications on Wall Street, 1991, pp. 10-15.
Yankelovich et al., "Intermedia: The Concept and the Construction of a Seamless Information Environment", IEEE Computer, Jan. 1988, pp. 81-96.
Yoon et al., "Letter-to-Sound Rules for Korean", IEEE Workshop on Speech Synthesis, 2002, 4 pages.
Zhao, Yunxin, "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zovato et al., "Towards Emotional Speech Synthesis: A Rule based Approach", 5th ISCA Speech Synthesis Workshop—Pittsburgh, 2004, pp. 219-220.
Applebaum et al., "Enhancing the Discrimination of Speaker Independent Hidden Markov Models with Corrective Training", International Conference on Acoustics, Speech, and Signal Processing, May 23, 1989, pp. 302-305.
Chang et al., "Discriminative Training of Dynamic Programming based Speech Recognizers", IEEE Transactions on Speech and Audio Processing, vol. 1, No. 2, Apr. 1993, pp. 135-143.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

(56) References Cited

OTHER PUBLICATIONS

Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. ASSP-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

(56) References Cited

OTHER PUBLICATIONS

Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/ Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-44489115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

(56) References Cited

OTHER PUBLICATIONS

Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
L.R. Bahl, F. Jelinek, and R.L. Mercer, "A Maximum Likelihood Approach to Continuous Speech Recognition," IEEE Trans. Pattern Anal. Mach. Intel., vol. PAMI-5, No. 2, pp. 179-190, Mar. 1983.
J.R. Bellegarda and D. Nahamoo, "Tied Mixture Continuous Parameter Modeling for Speech Recognition," IEEE Trans. Acoust., Speech, Signal Proc., vol. ASSP-38, No. 12, Dec. 1990.
J.R. Bellegarda, "Latent Semantic Mapping," Signal Proc. Magazine, Special Issue Speech Technol. Syst. Human-Machine Communication, L. Deng, K. Wang, and W. Chou, Eds., vol. 22, No. 5, pp. 70-80, Sep. 2005.
Hynek Hermansky "Perceptual Linear Predictive (PLP) Analysis of Speech," Speech Technology Laboratory, Division of Panasonic Technologies, Inc., Nov. 27, 1989.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: a Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in The Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.

(56) References Cited

OTHER PUBLICATIONS

Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial Intelligence Center, 19 pages.

Appelt, D., et al., SRI International Fastus System MUC-6 Test Results and Analysis, 1995, SRI International, Menlo Park, California, 12 pages.

Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI International, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

Bulyko, I. et al., "Error-Correction Detection and Response Generation in a Spoken Dialogue System," © 2004 Elsevier B.V., specom.2004.09.009, 18 pages.

Burke, R., et al., "Question Answering from Frequently Asked Question Files," 1997, AI Magazine, vol. 18, No. 2, 10 pages.

Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.

Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

Cheyer, A., et al., "Multimodal Maps: An Agent-based Approach," International Conference on Cooperative Multimodal Communication, 1995, 15 pages.

Cheyer, A., et al., "The Open Agent Architecture," Autonomous Agents and Multi-Agent systems, vol. 4, Mar. 1, 2001, 6 pages.

Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

Codd, E. F., "Databases: Improving Usability and Responsiveness—'How About Recently'," Copyright © 1978, by Academic Press, Inc., 28 pages.

Cohen, P.R., et al., "An Open Agent Architecture," 1994, 8 pages. http://citeseerx.ist.psu.edu/viewdoc/summary?doi=10.1.1.30.480.

Coles, L. S., et al., "Chemistry Question-Answering," Jun. 1969, SRI International, 15 pages.

Coles, L. S., "Techniques for Information Retrieval Using an Inferential Question-Answering System with Natural-Language Input," Nov. 1972, SRI International, 198 Pages.

Coles, L. S., "The Application of Theorem Proving to Information Retrieval," Jan. 1971, SRI International, 21 pages.

Constantinides, P., et al., "A Schema Based Approach to Dialog Control," 1998, Proceedings of the International Conference on Spoken Language Processing, 4 pages.

Cox, R. V., et al., "Speech and Language Processing for Next-Millennium Communications Services," Proceedings of the IEEE, vol. 88, No. 8, Aug. 2000, 24 pages.

Craig, J., et al., "Deacon: Direct English Access and Control," Nov. 7-10, 1966 AFIPS Conference Proceedings, vol. 19, San Francisco, 18 pages.

Dar, S., et al., "DTL's DataSpot: Database Exploration Using Plain Language," 1998 Proceedings of the 24th VLDB Conference, New York, 5 pages.

Davis, Z., et al., "A Personal Handheld Multi-Modal Shopping Assistant," 2006 IEEE, 9 pages.

Decker, K., et al., "Designing Behaviors for Information Agents," The Robotics Institute, Carnegie-Mellon University, paper, Jul. 6, 1996, 15 pages.

Decker, K., et al., "Matchmaking and Brokering," The Robotics Institute, Carnegie-Mellon University, paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.

Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.

Exhibit 1, "Natural Language Interface Using Constrained Intermediate Dictionary of Results," List of Publications Manually reviewed for the Search of U.S. Pat. No. 7,177,798, Mar. 22, 2013, 1 page.

Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Gambäck, B., et al., "The Swedish Core Language Engine," 1992 NOTEX Conference, 17 pages.

Glass, J., et al., "Multilingual Language Generation Across Multiple Domains," Sep. 18-22, 1994, International Conference on Spoken Language Processing, Japan, 5 pages.

Green, C. "The Application of Theorem Proving to Question-Answering Systems," Jun. 1969, SRI Stanford Research Institute, Artificial Intelligence Group, 169 pages.

Gregg, D. G., "DSS Access on the WWW: An Intelligent Agent Prototype," 1998 Proceedings of the Americas Conference on Information Systems-Association for Information Systems, 3 pages.

Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.

(56) References Cited

OTHER PUBLICATIONS

Grosz, B. et al., "Research on Natural-Language Processing at SRI," Nov. 1981, SRI International, 21 pages.
Grosz, B., et al., "TEAM: an Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Katz, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," in Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http.//www.cs.cmu.edu/larks html 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages.
Milstead, J., et al., "Metadata: Cataloging by Any Other Name . . . " Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.

(56) References Cited

OTHER PUBLICATIONS

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-lg/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.

Rudnicky, A.I., et al., "Creating Natural Dialogs in the Carnegie Mellon Communicator System."

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (INTERACT'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

Shklar, L., et al., "Info Harness: Use of Automatically Generated Metadata for Search and Retrieval of Heterogeneous Information," 1995 Proceedings of CAiSE'95, Finland.

Singh, N., "Unifying Heterogeneous Information Models," 1998 Communications of the ACM, 13 pages.

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

Stern, R., et al. "Multiple Approaches to Robust Speech Recognition," 1992, Proceedings of Speech and Natural Language Workshop, 6 pages.

Stickel, "A Nonclausal Connection-Graph Resolution Theorem-Proving Program," 1982, Proceedings of AAAI'82, 5 pages.

Sugumaran, V., "A Distributed Intelligent Agent-Based Spatial Decision Support System," Dec. 31, 1998, Proceedings of the Americas Conference on Information systems (AMCIS), 4 pages.

Sycara, K., et al., "Coordination of Multiple Intelligent Software Agents," International Journal of Cooperative Information Systems (IJCIS), vol. 5, Nos. 2 & 3, Jun. & Sep. 1996, 33 pages.

Sycara, K., et al., "Distributed Intelligent Agents," IEEE Expert, vol. 11, No. 6, Dec. 1996, 32 pages.

Sycara, K., et al., "Dynamic Service Matchmaking Among Agents in Open Information Environments," 1999, SIGMOD Record, 7 pages.

Sycara, K., et al., "The RETSINA MAS Infrastructure," 2003, Autonomous Agents and Multi-Agent Systems, vol. 7, 20 pages.

Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 EUROSPEECH—Scandinavia, 7th European Conference on Speech Communication and Technology, 5 pages.

Waldinger, R., et al., "Deductive Question Answering from Multiple Resources," 2003, New Directions in Question Answering, published by AAAI, Menlo Park, 22 pages.

(56) References Cited

OTHER PUBLICATIONS

Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Roddy, D., et al., "Communication and Collaboration in a Landscape of B2B eMarketplaces," VerticalNet Solutions, white paper, Jun. 15, 2000, 23 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc. v. West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.

(56) References Cited

OTHER PUBLICATIONS

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/sunnmary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Inter-

(56) References Cited

OTHER PUBLICATIONS pretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice On The Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).

\* cited by examiner

900

```
┌─────────────────────────────────────────────┐
│ REPRESENT PORTIONS (E.G., FRAMES) OF THE ACOUSTIC │
│ SIGNAL BY CLUSTER LABELS, WHEREIN EACH CLUSTER LABEL │
│   IS ASSOCIATED WITH A SET OF THE PORTIONS  │
│                    901                      │
└─────────────────────────────────────────────┘
                      │
┌─────────────────────────────────────────────┐
│   DETERMINE A FIRST PORTION ASSOCIATED WITH EACH │
│   CLUSTER LABEL (E.G., AN AVERAGE PORTION) FROM THE │
│              SET OF PORTIONS                │
│                    902                      │
└─────────────────────────────────────────────┘
                      │
┌─────────────────────────────────────────────┐
│   COMPUTE RESIDUALS (E.G., RESIDUAL VARIATIONS) FOR │
│   EACH OF THE PORTIONS ON THE FIRST PORTION (E.G., │
│     BY SUBTRACTING THE FIRST PORTION FROM EACH │
│            OF THE SET OF PORTIONS)          │
│                    903                      │
└─────────────────────────────────────────────┘
                      │
┌─────────────────────────────────────────────┐
│   REPRESENT THE RESIDUALS OF THE PORTIONS BY A │
│     REDUCED SET OF CONTINUOUS PARAMETERS    │
│                    904                      │
└─────────────────────────────────────────────┘
```

FIG. 9

METHODS AND APPARATUSES FOR AUTOMATIC SPEECH RECOGNITION

FIELD OF THE INVENTION

At least some embodiments of the present invention relate generally to language processing, and more particularly to automatic speech recognition.

BACKGROUND

Speech recognition, generally, is a process of converting an acoustic signal into a linguistic message. Automatic speech recognition is typically cast as an instance of information transmission over a noisy channel, which leads to the adoption of a statistical framework.

FIG. 1 is a block diagram illustrating a typical automatic speech recognition framework. As shown in FIG. 1, framework 200 includes a speech production side 101 and a speech recognition side 102. W refers to a sequence of words 103 intended to be produced and A refers to an acoustic realization of the word sequence 107. As shown in FIG. 1, the speech production 101 involves determination of the possibility 105 of the acoustic realization 107 based on the intended word sequence 103. $\hat{W}$ refers to a recognized sequence of words 113 output to the user. The speech recognition side 102 involves determination of the possibility 111 of the recognized sequence 113 based on the evidence observed 109. Typically, "production" and "recognition" terms are application-specific variants of the usual information-theoretic terminology "encoding" and "decoding."

As shown in FIG. 1, blocks in framework 200 are assigned a set of parameters of the form Pr(•|•), indicating the possibility of a noisy process characterized by a statistical model. Since the purpose of speech recognition is to recover the word sequence most likely intended by the user, the output sequence $\hat{W}$ 113 satisfies the following:

$$\hat{W} = \underset{W}{\operatorname{argmax}} Pr(W|A), \quad (1)$$

where the maximization is done over all possible word sequences in the language. Using Bayes' rule, (1) is typically re-written as:

$$\hat{W} = \underset{W}{\operatorname{argmax}} Pr(A|W)Pr(W), \quad (2)$$

which has the advantage of decoupling the two main aspects of the process: the acoustic model Pr(A|W) 105, which is in evidence on the speech production (or training) side 101 of FIG. 1, and the language model Pr(W), which simply models the prior probability of the word sequence W in the language. Typically, acoustic and language models are Markovian in nature, and commonly involve hidden Markov model ("HMM")/n-gram modeling.

In many applications such as automated dictation or computer data entry, it may be critical that the resulting message represent a verbatim transcription of a sequence of spoken words. Typically, a large vocabulary requires state-of-the-art acoustic modeling to use a large number of parameters. For example, while English has less than 50 phonemes (elementary units of sound), acoustic models in state-of-the-art systems commonly comprise tens to hundreds of thousands of parameters, e.g., Gaussian components. Typically, state-of-the-art acoustic models require such high dimensionality because of the extreme variability involved in the acoustic realization of the underlying phoneme sequence. As a result of this over-dimensioning, state-of-the-art acoustic systems consume a large amount of resources, which in turn makes them difficult to deploy on a mobile platform, e.g., the iPhone without compromising recognition accuracy.

SUMMARY OF THE DISCLOSURE

Exemplary embodiments of methods and apparatuses for automatic speech recognition are described. In at least some embodiments, first model parameters associated with a first representation of an input signal are generated. The input signal may be, for example, an acoustic sequence. The first representation may be a discrete parameter representation of the input signal. The discrete parameters may represent portions of the input signal, e.g., phonemes of the acoustic sequence. In one embodiment, first model parameters are generated from first training data. In one embodiment, the first model parameters are generated based on a phoneme sequence associated with a word sequence. A word sequence can be one or more words.

In at least some embodiments, second model parameters associated with a second representation of the input signal are generated. The second representation can include discrete parameters representing the portions of the input signal that are smaller than the first portions. For example, the second representation may include discrete parameters, e.g., cluster labels that represent sets of frames of the input signal. In one embodiment, second model parameters are generated from second training data. In one embodiment, the second model parameters are generated based on a cluster label sequence associated with a phoneme sequence.

In at least some embodiments, the second model parameters and the first model parameters are generated independently from each other based on different sets of data. In one embodiment, the second representation of the input signal includes a continuous parameter representation of residuals of the input signal. For example, residuals of the input signal may be represented by one or more continuous parameters (e.g., Gaussian distributions).

In at least some embodiments, third model parameters are generated to couple the first representation of the input signal with the second representation of the input signal. In one embodiment, generating the third model parameters involves mapping the first representation and the second representation of the input signal into a vector space. In one embodiment, the first, second and third model parameters are created in a process for building an acoustic language model for a speech recognition system, and this acoustic language model can, after it is built, be used in a speech recognition system with or without a conventional language model which assists in the recognition process. The incorporation of both continuous representations (e.g. for residuals in the acoustic model) and discrete representations in the acoustic model can reduce the amount of memory or processing required by the speech recognition system.

In at least some embodiments, portions of an acoustic signal are received in a speech recognition process after an acoustic model has been created. The portions of the acoustic signal may be, for example, frames. A likelihood of a recovered first parameter sequence representing the portions of the acoustic signal can be determined. For example, a likelihood of a recovered cluster label sequence representing a set of frames of the acoustic signal can be determined.

A likelihood of a recovered second parameter sequence associated with the recovered first parameter sequence can be determined. For example, a likelihood of a recovered phoneme parameter sequence associated with the recovered cluster label sequence can be determined. In at least some embodiments, the second parameter sequence represents the portions of the acoustic signal that have a coarser granularity ("greater") (e.g. greater in time) than the portions of the acoustic signal represented by the first parameter sequence. For example, the portions of the acoustic signal associated with phonemes represented by the phoneme parameter sequence have coarser granularity (e.g. greater in time) than the portions of the acoustic signal associated with the sets of frames represented by the cluster label sequence. The difference in the two portions can be considered to be a difference in granularity or resolution in time.

In at least some embodiments, a joint likelihood of the first parameter sequence and the second parameter sequence associated with a word sequence is determined.

In at least some embodiments, a likelihood of a recovered word sequence is determined based on the recovered second parameter sequence. For example, a likelihood of a recovered word sequence may be determined based on the recovered sequence of phonemes. The recovered word sequence can be outputted.

In at least some embodiments, portions (e.g., frames) of the acoustic signal are represented by first parameters (e.g., cluster labels), wherein a first parameter is associated with a set of the portions. A representative portion of the set of portions may be associated with a first parameter. For example, an average frame of the set of frames of the acoustic signal may be associated with each cluster label. Residuals of the acoustic signal can be computed based on the first parameters.

The residual variations of the portions of the acoustic signal can be computed relative to representative portion associated with a first parameter. For example, residual variations may be determined by subtracting the average frame associated with each cluster label from each frame of the set of frames of the acoustic signal. The residuals of the acoustic signal can be represented by one or more continuous parameters (e.g., Gaussian distributions).

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 9 is a flowchart of one embodiment of a method to provide an intermediate representation of an input acoustic signal.

DETAILED DESCRIPTION

Figure 1:
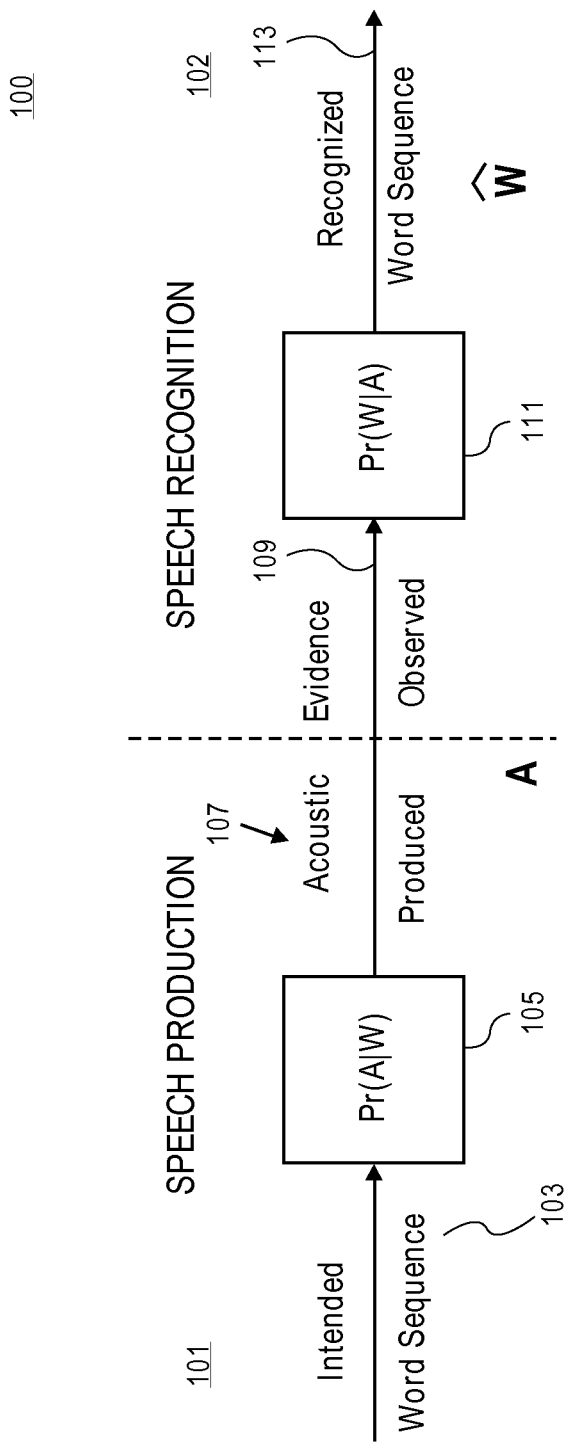
FIG. 1 is a block diagram illustrating a typical automatic speech recognition framework.

The embodiments of the invention will be described with references to numerous details set forth below, and the accompanying drawings will illustrate the embodiments of the invention. The following description and drawings are illustrative of the embodiments of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Exemplary embodiments of methods and apparatuses for automatic speech recognition are described. The embodiments of the invention address a serious bottleneck in large vocabulary continuous speech recognition that is the explosion in the number of parameters necessary for effective acoustic modeling. Variability in the acoustic realization of the underlying phoneme sequence can largely be viewed as an artifact of the speech production apparatus, which in effect transduces a more detailed, yet still fairly low-dimensional, description of the appropriate sound sequence. Thus, exposing this low-dimensional, detailed description enables a large fraction of the variability to be dealt with outside of the continuous parameter Gaussian layer. This provides a rationale for re-formulating the problem in a way that can leverage the resulting dimensionality reduction. The methods and apparatuses for speech recognition described herein, in one embodiment, provide a mathematically coherent way of dimensionality reduction that essentially minimizes both information loss and model mismatch. More specifically, the embodiments of the invention can rely on decoupling of various levels of discrete and continuous representations of the observed speech evidence. Typically, generating a discrete representation of the observed speech evidence involves mapping observations (e.g., measurements) to a finite set of representations (e.g., cluster labels, phonemes, and the like). Generally, the discrete representation of the observed speech evidence includes a finite number of representations associated with the observed speech evidence. Generating a continuous representation typically involves mapping potentially infinite number of observations (e.g., measurements) into a continuous vector space ("feature space"). Generally, the continuous representation of the observed speech evidence includes a potentially infinite number of representations associated with the observed speech evidence.

In at least some embodiments, the ensuing discrete and continuous parameterizations of an acoustic signal are decoupled using two simple distortion models and a small latent perception model, as described in further detail below. The methods and apparatuses for speech recognition described herein are performed at smaller computational/memory cost than existing solutions, without compromising recognition accuracy. In at least some embodiments, the methods and apparatuses for speech recognition described herein can be efficiently incorporated into resource-limited mobile platforms, e.g., iPhones (or other consumer electronic devices). Generally, the methods and apparatuses described herein can advantageously be applied (may be with slight modifications) to any application involving any noisy patterns, for example, an automatic speech recognition, recovery of biometric data, handwriting recognition, and the like applications.

Figure 2:
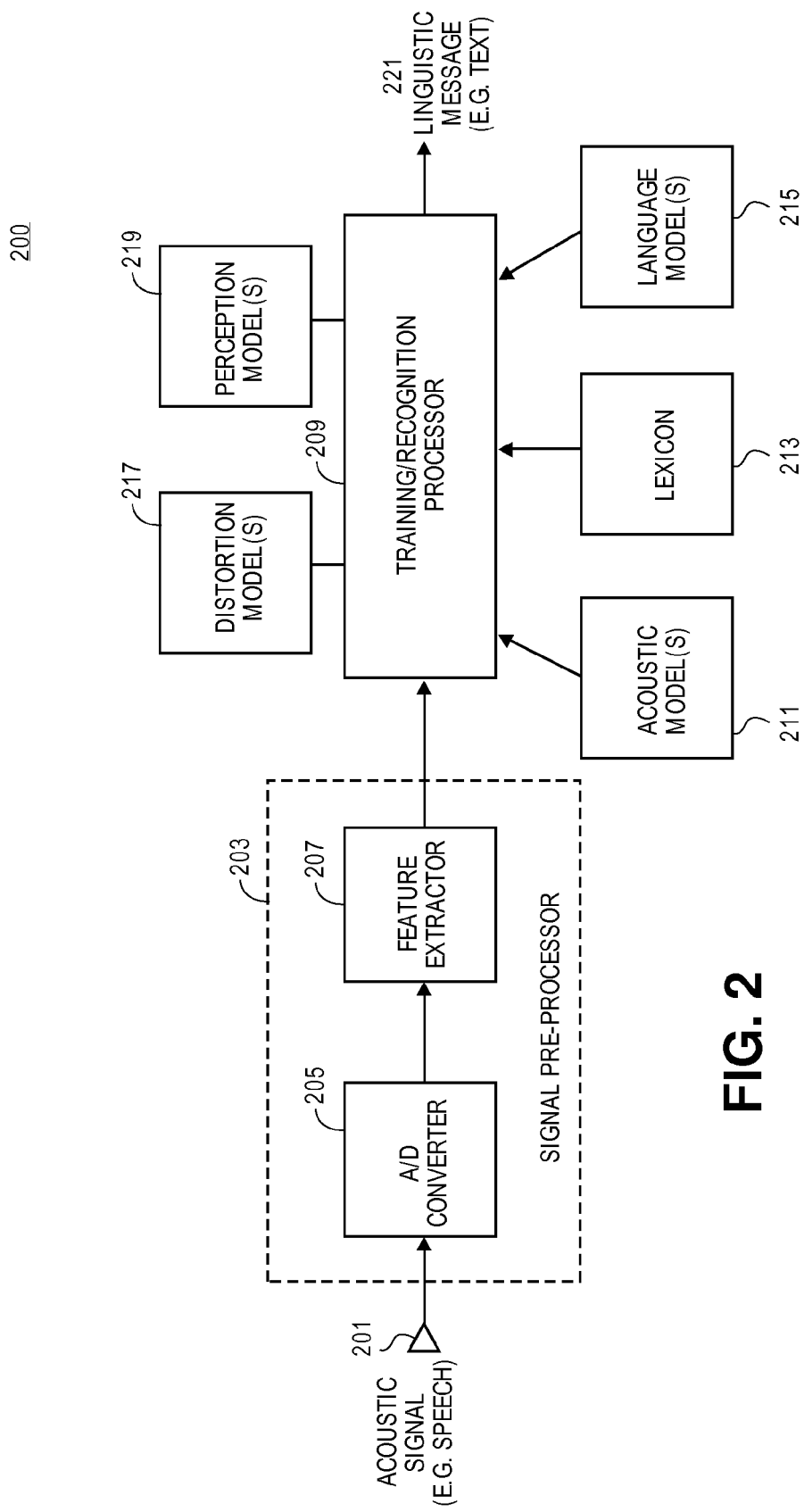
FIG. 2 shows a block diagram of one embodiment of a speech recognition system.

FIG. 2 shows an embodiment of a speech recognition system 200 including a transducer 201, a signal pre-processor 203, a training/recognition processor 209, one or more acoustic models 211, a lexicon 213, and one or more language models 215. The signal pre-processor 203 includes an analog-to-digital (A/D) converter 205 and a feature extractor 207. As shown in FIG. 2, an acoustic signal is input to the transducer 201, and an output of the transducer 201 is coupled to an input of the A/D converter 205. Transducer 201 may be, for example, a microphone. A corresponding analog electrical signal, output by the transducer 201, is then converted to digital form by the A/D converter 205. The resulting digital speech samples are then processed in successive time intervals within the feature extractor 207, for example, using methods that are known to one of ordinary skill in the art of language processing, to produce acoustic feature vectors. In at least some embodiments, the training/recognition processor 209 receives output from signal pre-processor 203 (e.g., acoustic feature vectors) and based on one or more acoustic models 211, a lexicon 213, a language model 215, one or more distortion models 217, and a perception model 219, and training data, produces a linguistic message output 221, as described in further detail below. Generally, acoustic modeling couples a low level description of speech signal that may be a sequence of frames described by Mel-frequency cepstral coefficients (MFCCs) back to a sequence of words. Typically, language modeling can be used to constrain the search space for the acoustic modeling. Conventional language models can be used with the embodiments of the acoustic models described herein.

In at least some embodiments, the training/recognition processor 209 generates sets of model parameters associated with different representations of an input signal independent from each other using distortion models 217 and a perception model 219, as described in further detail below. In at least some embodiments, the set of acoustic models 211 (e.g., Hidden Markov Models), distortion model(s) 217 and a perception model 219 can be used to evaluate the feature vectors output by the feature extractor 207 against basic units of speech, such as phonemes, triphones, or allophones, as described in further detail below. The most likely basic units of speech are then processed, in accordance with information provided by the lexicon 213 and the language model 215 (if used), to generate the final linguistic message output. Generally, the lexicon 213 defines the vocabulary of the recognition system 200 in terms of the basic speech elements (words), and the language model 215 defines allowable sequences of vocabulary items. The language model 215 may be a stochastic language model which provides a set of a priori probabilities, each probability indicating a likelihood that a given word may occur in a particular context. Such a set of a priori probabilities may be used, for example, to help search for and prioritize candidate output messages based on sequences of basic speech elements.

Figure 3:
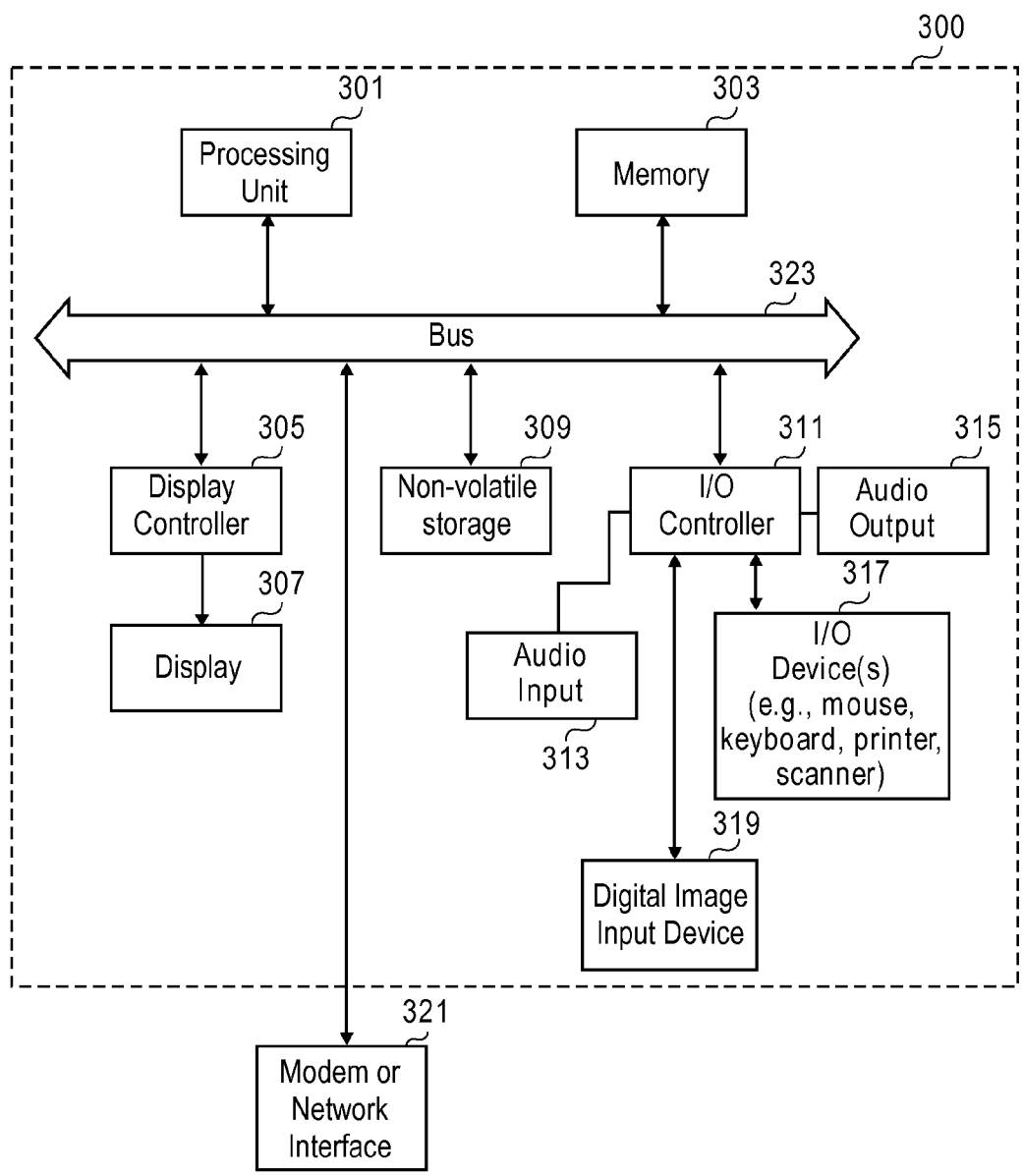
FIG. 3 shows a block diagram of one embodiment of a data processing system for automatic speech recognition.

FIG. 3 shows a block diagram 300 of one embodiment of a data processing system for automatic speech recognition. Data processing system 300 includes a processing unit 301 that may include a microprocessor, such as an Intel Pentium® microprocessor, Motorola Power PC® microprocessor, Intel Core™ Duo processor, AMD Athlon™ processor, AMD Turion™ processor, AMD Sempron™ processor, and any other microprocessor. Processing unit 301 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. In one embodiment, processing unit 301 includes a general purpose data processing system based on the PowerPC®, Intel Core™ Duo, AMD Athlon™, AMD Turion™ processor, AMD Sempron™, HP Pavilion™ PC, HP Compaq™ PC, and any other processor families. Processing unit 301 may be a conventional microprocessor such as an Intel Pentium microprocessor or Motorola Power PC microprocessor.

As shown in FIG. 3, memory 303 is coupled to the processing unit 301 by a bus 323. Memory 303 can be dynamic random access memory (DRAM) and can also include static random access memory (SRAM). A bus 323 couples processing unit 301 to the memory 303 and also to non-volatile storage 309 and to display controller 305 (if a display is used) and to the input/output (I/O) controller(s) 311. Display controller 305 controls in the conventional manner a display on a display device 307 which can be a cathode ray tube (CRT) or liquid crystal display (LCD). The input/output devices 317 can include a keyboard, disk drives, printers, a scanner, a camera, and other input and output devices, including a mouse or other pointing device. One or more input devices 317, such as a scanner, keyboard, mouse or other pointing device can be used to input a text. The I/O controller 311 is coupled to one or more audio input devices 313, for example, one or more microphones, to receive audio signals.

The display controller 305 and the I/O controller 311 can be implemented with conventional well known technology. An audio output 315, for example, one or more speakers may be coupled to an I/O controller 311 to produce speech. The non-volatile storage 309 is often a magnetic hard disk, an optical disk, or another form of storage for large amounts of data. Some of this data is often written, by a direct memory access process, into memory 303 during execution of software in the data processing system 300. One of skill in the art will immediately recognize that the terms "computer-readable medium" and "machine-readable medium" include any type of storage device that is accessible by the processing unit 301. A data processing system 300 can interface to external systems through a modem or network interface 321. It will be appreciated that the modem or network interface 321 can be considered to be part of the data processing system 300. This interface 321 can be an analog modem, ISDN modem, cable modem, token ring interface, satellite transmission interface, or other interfaces for coupling a data processing system to other data processing systems.

It will be appreciated that data processing system 300 is one example of many possible data processing systems which have different architectures. For example, personal computers based on an Intel microprocessor often have multiple buses, one of which can be an input/output (I/O) bus for the peripherals and one that directly connects the processing unit 301 and the memory 303 (often referred to as a memory bus). The buses are connected together through bridge components that perform any necessary translation due to differing bus protocols.

Network computers are another type of data processing system that can be used with the embodiments of the present invention. Network computers do not usually include a hard disk or other mass storage, and the executable programs are loaded from a network connection into the memory 303 for execution by the processing unit 301. A Web TV system, which is known in the art, is also considered to be a data processing system according to the embodiments of the present invention, but it may lack some of the features shown in FIG. 3, such as certain input or output devices. A typical data processing system will usually include at least a processor, memory, and a bus coupling the memory to the processor. A data processing system that is configured to provide one or more embodiments described herein can be a computer system or a cellular telephone or an entertainment or game system or other consumer electronic devices or an embedded system in a consumer device.

It will also be appreciated that the data processing system 300 can be controlled by operating system software which includes a file management system, such as a disk operating system, which is part of the operating system software. One example of operating system software is the family of operating systems known as Macintosh® Operating System (Mac OS®) or Mac OS X® from Apple Inc. of Cupertino, Calif. Another example of operating system software is the family of operating systems known as Windows® from Microsoft Corporation of Redmond, Wash., and their associated file management systems. The file management system is typically stored in the non-volatile storage 309 and causes the processing unit 301 to execute the various acts required by the operating system to input and output data and to store data in memory, including storing files on the non-volatile storage 309.

It will be apparent from this description that aspects of the present invention may be embodied, at least in part, in software, e.g., operating system software, and any other application software. That is, the techniques may be carried out in a data processing system or other data processing system in response to its processor, such as a microprocessor, executing sequences of instructions contained in a memory, such as ROM, volatile RAM, non-volatile memory, cache, or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing unit 105.

A machine readable medium can be used to store software and data which when executed by a data processing system causes the system to perform various methods of the present invention. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods of the present invention can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 300 of FIG. 3.

Many of the methods of the present invention may be performed with a digital processing system, such as a conventional, general-purpose computer system. The computer systems may be, for example, entry-level Mac mini and consumer-level iMac desktop models, the workstation-level Mac Pro tower, the MacBook and MacBook Pro laptop computers, and iPhones produced by Apple Inc., located in Cupertino, Calif. Small systems (e.g. very thin laptop computers) can benefit from the methods described herein. Special purpose computers, which are designed or programmed to perform only one function, or consumer electronic devices, such as a cellular telephone, a digital camera, or an embedded system may also perform the methods described herein.

Generally, depending on the representation chosen for the acoustic signal, two types of acoustic models can be distinguished. Typically, continuous parameter models model speech frames directly, usually with a mixture of continuous Gaussian distributions.

Discrete parameter models typically quantize each speech frame using a codebook, and model the set of cluster labels so obtained with an empirical discrete distribution. The main trade-off involves computational complexity versus accuracy of the representation. Typically, tied mixture systems attempt to bridge the gap between the discrete and continuous types of representation, but by design the mixture and distribution parameters are intended to be trained simultaneously based on the same data.

Once common in the field, discrete parameterizations have fallen out of favor in the past decade, largely due to the loss of information that results from quantization. This loss of information may not be a problem for small-to-medium vocabulary usage such as command and control, but it tends to be deleterious in large vocabulary applications like transcription. On the other hand, continuous parameterizations usually suffer from both model mismatch and parameter explosion, as the unknown underlying true distribution may well require a huge number of mixture components before it can satisfactorily be approximated by a Gaussian mixture.

In fact, it is fairly common these days to see large vocabulary recognition systems having tens to hundreds of thousands of Gaussian components. Yet most languages in the world only comprise a relatively small number of distinct, basic units of sound, e.g., phonemes, triphones, and allophones. For example, a typical language rarely requires more than about 100 phonemes and about 2000 allophones. English language, for example, comprises less than 50 phonemes; even when purposely allowing for some redundancy in the alphabet. Japanese language has about 40 phonemes. German language has about 70. At first glance, it therefore appears that common Gaussian parameterizations are grossly over-dimensioned, which in turn places tremendous (and potentially unnecessary) strains on the amount of resources necessary to perform automatic recognition.

The reason for the apparent discrepancy between the small set of underlying phonemes in the language and the large number of Gaussian components ultimately required to model them has to do with the extreme variability involved in the acoustic realization of the intended phoneme sequence. Yet one could argue that this acoustic realization, at some basic level, is but an artifact of the speech production apparatus, which in effect only transduces a more detailed, yet still low-dimensional, description of the appropriate sequence of units to be generated. Exposing this detailed description can therefore enable a large fraction of the variability to be dealt with outside of the traditional continuous Gaussian layer, as described in further detail below.

Figure 4:
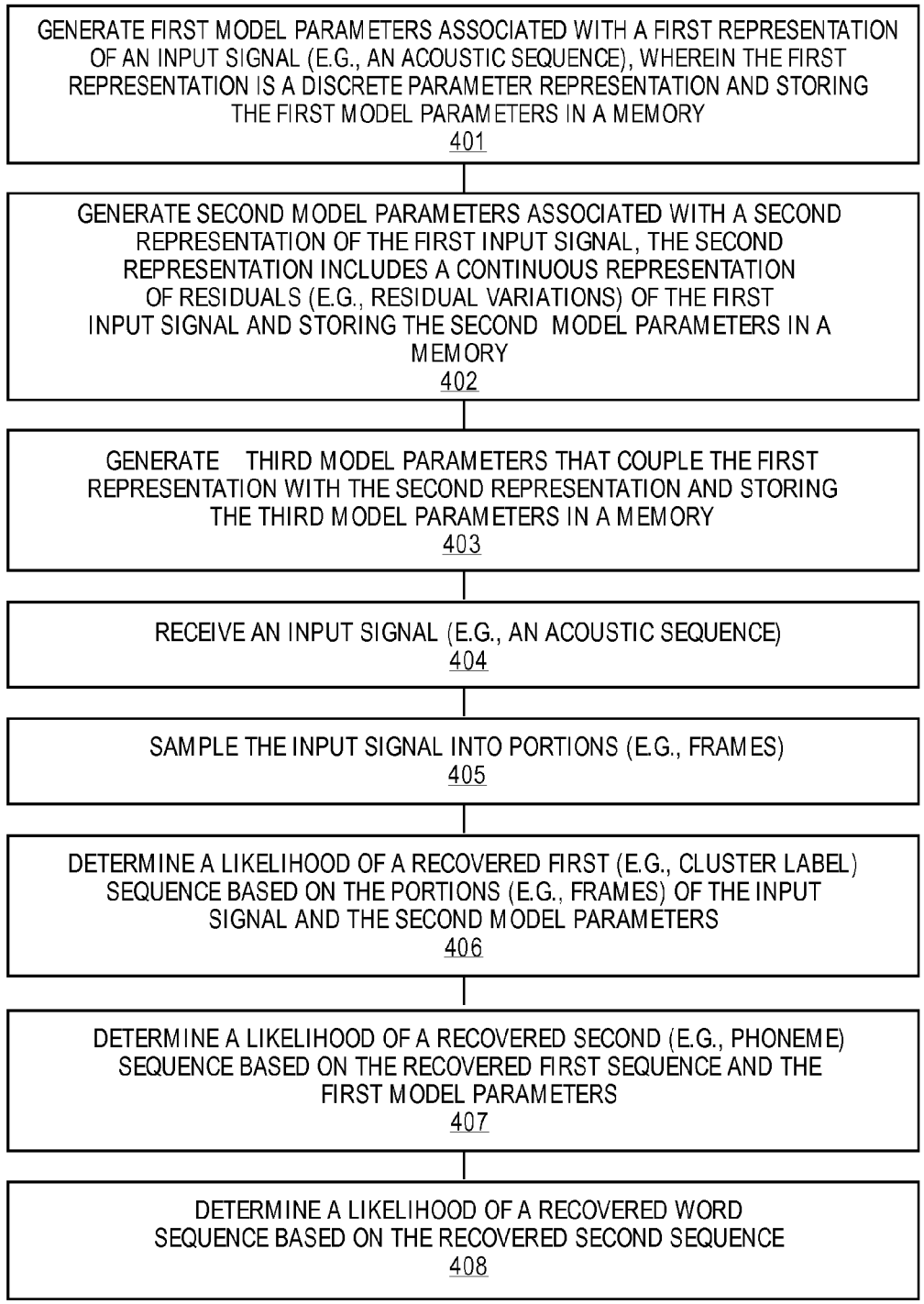
FIG. 4 shows a flowchart of one embodiment of a method to perform automatic speech recognition.

FIG. 4 shows a flowchart of one embodiment of a method to perform automatic speech recognition. Method 400 begins with operation 401 involving generating first model parameters associated with a first representation of an input signal from first training data. An input signal may be, for example, an acoustic sequence. In one embodiment, the first representation is a discrete parameter representation of the input signal. The discrete parameter representation usually means describing an input acoustic signal using a discrete parameter model. The first model parameters can be stored in a memory of a data processing system, e.g., memory 303 depicted in FIG. 3. In one embodiment, the first model parameters are generated based on a phoneme sequence associated with a word sequence. In one embodiment, generating the first model parameters involves training a coarse distortion model based on the training data. In one embodiment, the trained coarse distortion model is applied to an observed acoustic evidence and training data for speech recognition, as described in further detail below.

Figure 7:
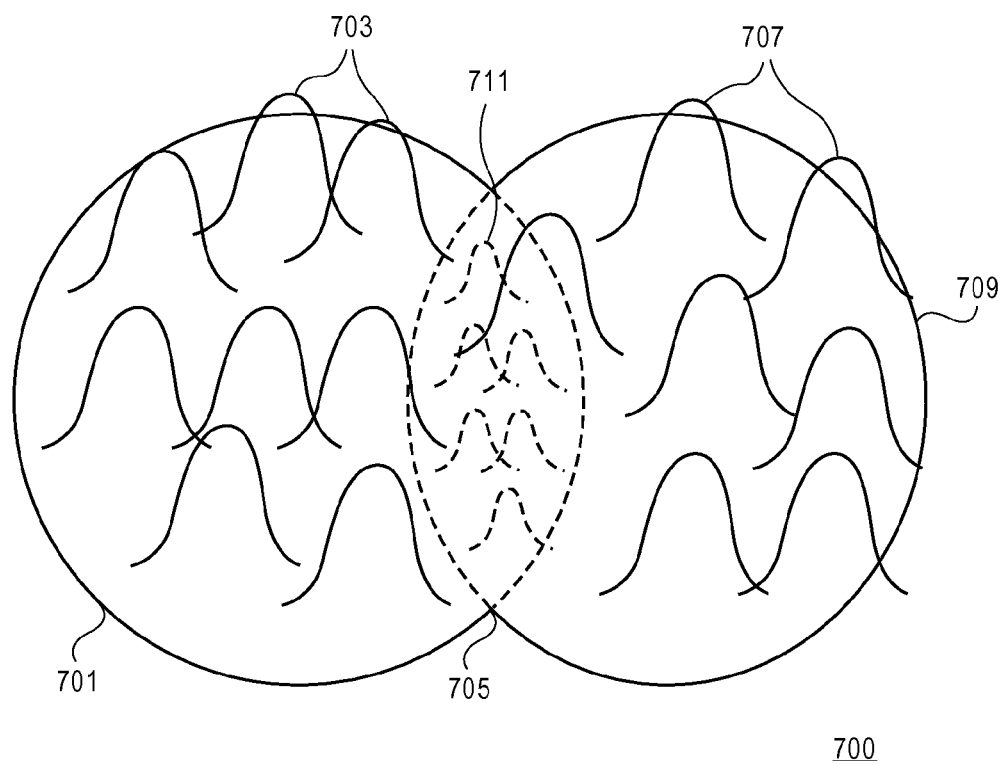
FIG. 7 illustrates one embodiment of a two-dimensional projection of a feature space represented by continuous parameters of an input acoustic signal.

FIG. 7 illustrates one embodiment of two-dimensional projection 700 of a feature space represented by continuous parameters of an input acoustic signal. Two-dimensional projection 700 includes a feature space 701 of a first phoneme overlapping with a feature space 709 of a second phoneme. As shown in FIG. 7, the first phoneme can be described by a set of statistical distributions of continuous parameters 703. The second phoneme can be described by a set of statistical distributions of continuous parameters 707. The statistical distributions of continuous parameters may be, for example, Gaussian distributions. The continuous parameters may be represented by means and variances of the Gaussian distributions, as known to one of ordinary skill in the art of language processing. Each point in space 700 can be a representation of a frame of the acoustic signal. Each frame of the acoustic signal may be described by a series of parameters (e.g., 12-39 parameters) collated into a feature vector. The feature vector parameters may be mel-frequency cepstral coefficients ("MFCC"), linear predictive coding ("LPC") parameters, or any other suitable encoding scheme, as known to one of ordinary skill in the art of language processing. As shown in FIG. 7, a feature space representing overlapping 705 of two phonemes may be described by a set of statistical distributions of continuous parameters 711. As shown in FIG. 7, continuous parameters representation of the acoustic evidence requires adding more continuous parameters for more accurate recognition of an audio signal. For example, state-of-the art speech recognition systems may include from the hundreds of thousands to millions of continuous parameters.

In one embodiment, an input acoustic signal represented by discrete parameters is modeled separately from residuals of the input acoustic signal represented by a reduced continuous parameters layer (e.g., a reduced Gaussian layer), as described in further detail below.

This provides a rationale for introducing an explicit representation for this discrete detailed description, in such a way that the mapping from phonemes to this additional discrete layer can absorb most of the presumed degrees of freedom available. This in turn can amount to setting up both discrete and continuous kinds of parameterizations simultaneously, albeit in two separate layers, and training them separately, in a decoupled manner, possibly with different data. This can re-formulate the problem so as to seize the opportunity to leverage dimensionality reduction, in order to effectively minimize both information loss and model mismatch.

Figure 10:
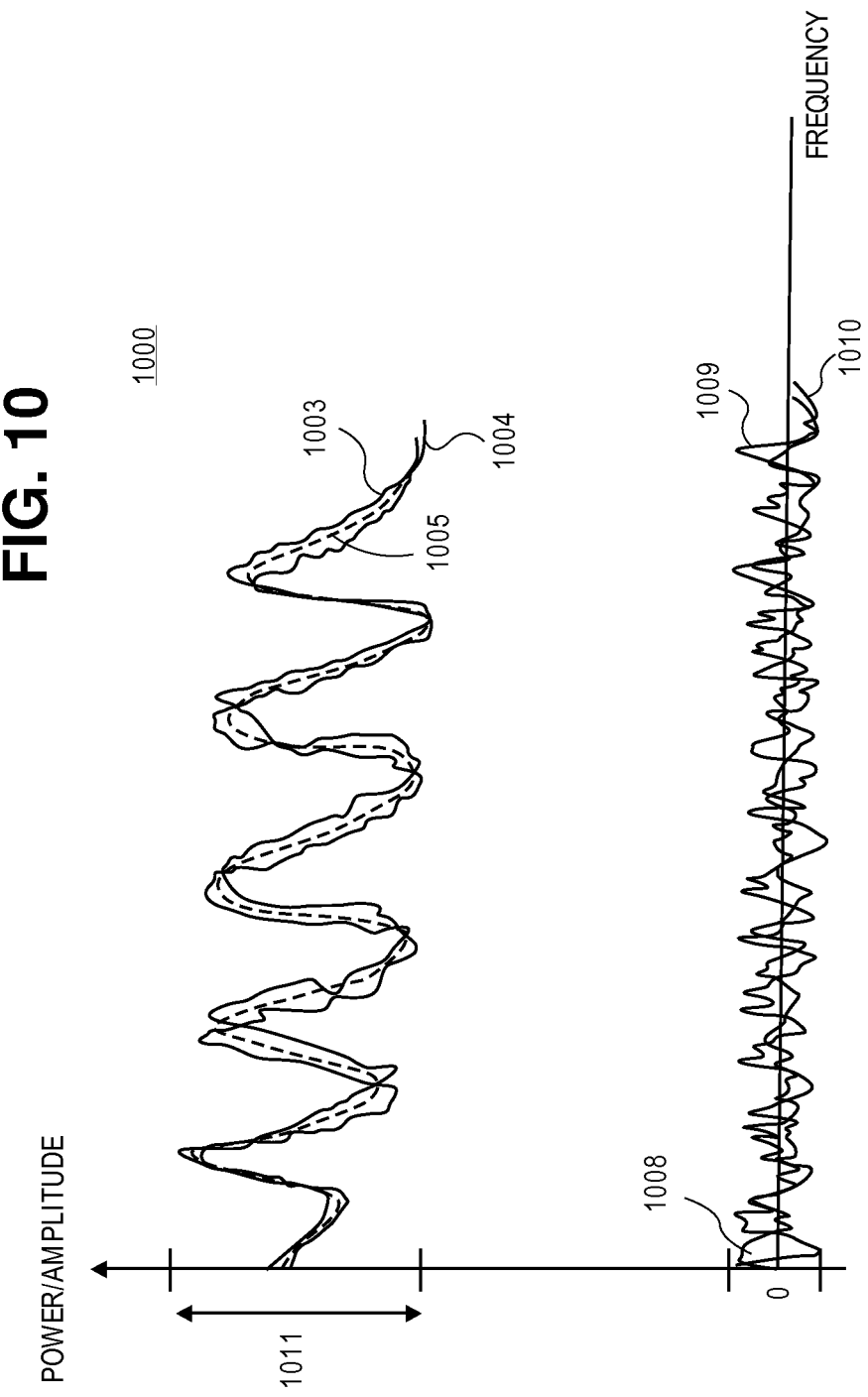
FIG. 10 illustrates one embodiment of a method to provide residuals of the acoustic signal.

FIG. 10 illustrates one embodiment to provide residuals of the acoustic signal. FIG. 10 depicts power or amplitude of an acoustic signal versus frequency. As shown in FIG. 10, a waveform 1003 of the acoustic signal is different from a waveform 1004 of the acoustic signal. Waveforms 1003 and 1004 may represent the acoustic signal associated with the same word sequence. In one embodiment, waveforms 1003 and 1004 having dynamic range of variations 1011 are represented by a mean waveform 1005 (dashed line). As shown in FIG. 10, mean waveform 1005 may encode generic (e.g., predictable) variations of the original waveforms 1003 and 1004. As shown in FIG. 10, residual variations 1009 and 1010 obtained by subtracting mean waveform 1005 from waveforms 1003 and 1004 vary around zero mean. Residual variations 1009 and 1010 have substantially smaller dynamic range of variations 1008 than dynamic range 1011. Therefore, the residual variations of the acoustic signal, such as residual variations 1009 and 1010 can be described by a substantially smaller number of continuous parameters than each of the waveforms 1003 and 1004. In one embodiment, mean waveform 1005 may represent a detailed, yet still low-dimensional description of the acoustic signal. In one embodiment, a mean waveform 1005 having dynamic variability range 1011 is described by a set of discrete parameters, and residual variations 1009 and 1010 of the waveforms 1003 and 1004 around zero mean are described by a reduced set of continuous parameters. In one embodiment, the reduced set of the continuous parameters describing the residual variations of the acoustic signal contains about 500-2000 parameters. In one embodiment, a residual variability of the acoustic evidence can be modeled with a reduced set of the continuous parameters (e.g. Gaussians) by a continuous parameter representation and a systemic (generic) variability associated with speech production and any other predictable variability is removed from the continuous parameter representation and is modeled with a set of discrete (more detailed) parameters, such as cluster label parameters. That is, the acoustic model describing the acoustic sequence can be reduced from the millions of parameters down to 500-2000 parameters that significantly increase efficiency without reducing the accuracy of the speech recognition.

Referring back to FIG. 4, method 400 continues with operation 402 involving generating second model parameters associated with a second representation of the input signal from second training data. In one embodiment, the second training data that are fed to a data processing system to generate second model parameters are different from the first training data that are fed to the data processing system to generate the first model parameters. In one embodiment, the second representation includes a second discrete parameter representation of the input signal and a continuous parameter representation of residuals of the input signal, as described in further detail herein. The second model parameters can be stored in a memory of a data processing system, e.g., memory 303. In one embodiment, the second model parameters are generated based on a cluster label sequence associated with a word sequence. In one embodiment, generating the second model parameters involves training a detailed distortion model based on the second training data. In one embodiment, the trained detailed distortion model is applied to an observed acoustic evidence and training data for speech recognition, as described in further detail below.

In one embodiment, the first representation of the input acoustic signal includes discrete parameters representing first portions of the input acoustic signal, and the second representation of the input acoustic signal includes discrete parameters representing second portions of the input signal. In one embodiment, the first portions of the acoustic signal and the second portions of the acoustic signal are provided simultaneously, and the second portions of the acoustic signal have finer granularity ("smaller") than the first portions of the acoustic signal. For example, the first portions of the input acoustic signal may be associated with phonemes, and the second portions may be associated with sets of frames of the input acoustic signal. In one embodiment, the second portions of the acoustic signal represented by the first parameter representation are greater than a frame of the input acoustic signal.

At operation 403, third model parameters can be generated to couple the first representation and the second representation of the input acoustic signal from third training data. The third model parameters can be stored in a memory of a data processing system, e.g., memory 303. In one embodiment, the first model parameters, the second model parameters, and the third model parameters are generated in a de-coupled manner, independent from each other. That is, the first model parameters, the second model parameters, and the third model parameters can be generated in different time based on different sets of data. In one embodiment, the first model parameters, the second model parameters, and the third model parameters are generated in the same time independently from each other based on the different sets of data. That is, sets of data fed into a data processing system to train each of the first model parameters, second model parameters, and the third model parameters can be different from each other.

In one embodiment, generating the third model parameters includes mapping the first representation and the second representation into a vector space, as described in further detail below. In one embodiment, generating the first model parameters includes training a first distortion model based on the first training data, generating the second model parameters includes training a second distortion model based on the second training data, and generating the third model parameters includes training a latent perception model based on the third training data, as described in further detail below.

In one embodiment, generating the first model parameters associated with a first representation of the input acoustic signal includes determining a likelihood (e.g., a conditional probability) of a phoneme sequence associated with a word sequence. That is, a corpus of the first model parameters may include one or more phoneme sequences associated with one or more word sequences. In one embodiment, generating the second model parameters includes determining a likelihood of a cluster label sequence derived from the phoneme sequence that is associated with the word sequence. That is, a corpus of the second model parameters may include one or more cluster label sequences derived from the corresponding phoneme sequences. In one embodiment, a likelihood of the produced acoustic evidence is determined based on one or more cluster label sequences.

Figure 5:
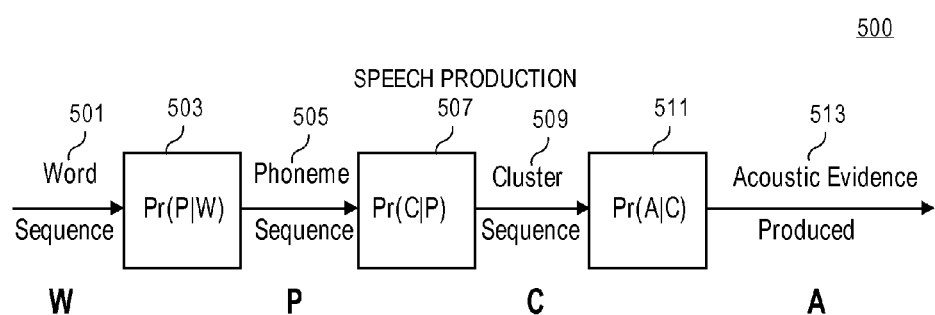
FIG. 5 is a block diagram of one embodiment of a speech training/production side of an automatic speech recognition framework.

FIG. 5 is a block diagram of one embodiment of a speech training/production side of an automatic speech recognition framework. As shown in FIG. 5, W refers to a sequence of words 501 intended to be produced, A refers to an acoustic realization of the word sequence 513 ("acoustic evidence produced"), P refers to an ideal phoneme sequence 505 associated with the intended word sequence 501, and C refers to an ideal discrete, low-dimensional cluster label sequence 509 derived from phoneme sequence 505. As shown in FIG. 5, the speech training/production 500 involves determination of the likelihood (e.g., a conditional probability) 503 of the ideal phoneme sequence 505 based on the intended word sequence 501, determination of the likelihood 507 of the an ideal discrete, low-dimensional cluster label sequence 509 based on phoneme sequence 505, and determination of the likelihood 511 of the acoustic evidence produced 513 based on cluster label sequence 509 derived from phoneme sequence 505.

Referring back to FIG. 4, method 400 continues with operation 404 that involves receiving an input signal. The input signal may be, for example, an acoustic sequence. At operation 405 the received input signal is sampled into portions. For example, the input signal, e.g., an acoustic evidence may be samples into frames. Each frame can have the duration, for example, in the approximate range of 10 milliseconds ("ms") to 30 ms in duration. In one embodiment, the duration of each frame of the acoustic evidence is about 10 ms. At operation 406 a likelihood of a recovered first parameter sequence is determined based on the portions of the captured input signal and the second model parameters. For example, a likelihood of a recovered cluster label sequence can be computed based on the sets of frames of the acoustic evidence and the cluster labels derived from the second training data.

At operation 407 a likelihood of a recovered second parameter sequence is determined based on the recovered first parameter sequence and the first model parameters. For example, a likelihood of a recovered phoneme sequence can be computed based on the recovered cluster label sequence and the phoneme sequence model parameters. At operation 408 a recovered third sequence is determined based on the second recovered sequence. For example, a likelihood of a recovered word sequence can be computed based on the recovered phoneme sequence. Operations 406-408 are described in further detail below.

Figure 6:
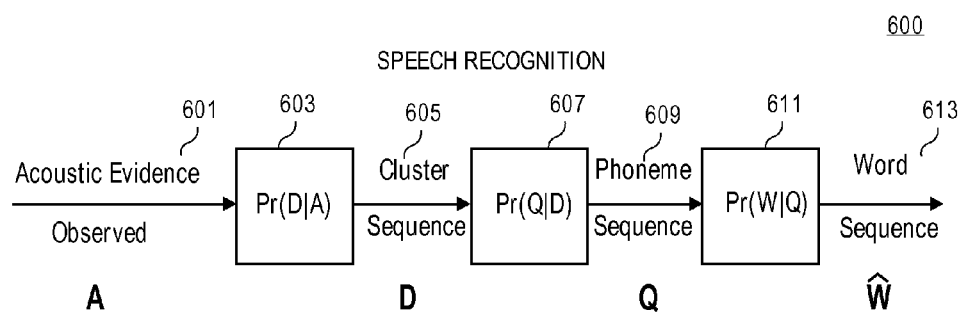
FIG. 6 is a block diagram of one embodiment of a speech recognition side of an automatic speech recognition framework.

FIG. 6 is a block diagram of one embodiment of a speech recognition side 600 of an automatic speech recognition framework. As shown in FIG. 6, Ŵ refers to a recognized sequence of words 613 output to the user, A refers to an acoustic evidence produced 601, D refers to a cluster label sequence 605 recovered from the observed acoustic evidence 601, and Q refers to a recovered phoneme sequence 609 associated with the recovered cluster label sequence 605.

As shown in FIG. 6, the speech recognition side 600 involves determination of the likelihood (e.g., a conditional probability) 603 of the recovered cluster label sequence 607 based on the acoustic evidence produced 601, determination of the likelihood 607 of the recovered phoneme sequence 609 based on cluster label sequence 605, and determination of the likelihood 611 of the recognized word sequence 613 based on phoneme sequence 609 associated with the recovered cluster label sequence 605.

As shown in FIGS. 5 and 6, the automatic speech recognition framework establishes a formal relationship between C and D, two discrete representations of the acoustic evidence, and A, now assumed to be a continuous representation of that evidence. However, contrary to typical usage in discrete HMM parameterizations, in one embodiment sequence length for labels and frames can be different (i.e., they do not have to be equal in length.

In one embodiment, a cluster label represents a set of frames of the input signal. In one embodiment, a cluster label represents a portion of the acoustic evidence having a duration in time longer than the duration in time of a frame of the acoustic evidence and shorter than the duration in time of a phoneme associated with the acoustic evidence. For example, in one embodiment a cluster label may represent a portion of the acoustic evidence having the duration longer than about 10 ms and shorter than about 250 ms. In one embodiment, a phoneme parameter represents a portion of the acoustic evidence having a duration equal to the duration of a phoneme. For example, a phoneme parameter may represent a portion of the acoustic evidence having the duration of about 250 ms.

The embodiment of the framework depicted in FIGS. 5 and 6 exhibits two major differences compared to that of FIG. 1: (i) it explicitly introduces a phoneme recognition stage in the formulation, and (ii) it decouples the two types of acoustic model parameterizations. These (i) and (ii) aspects have a major role to play in dimensionality reduction. They are also instrumental in the concepts of latent perception and distortion modeling, as described in further detail below.

Figure 8:
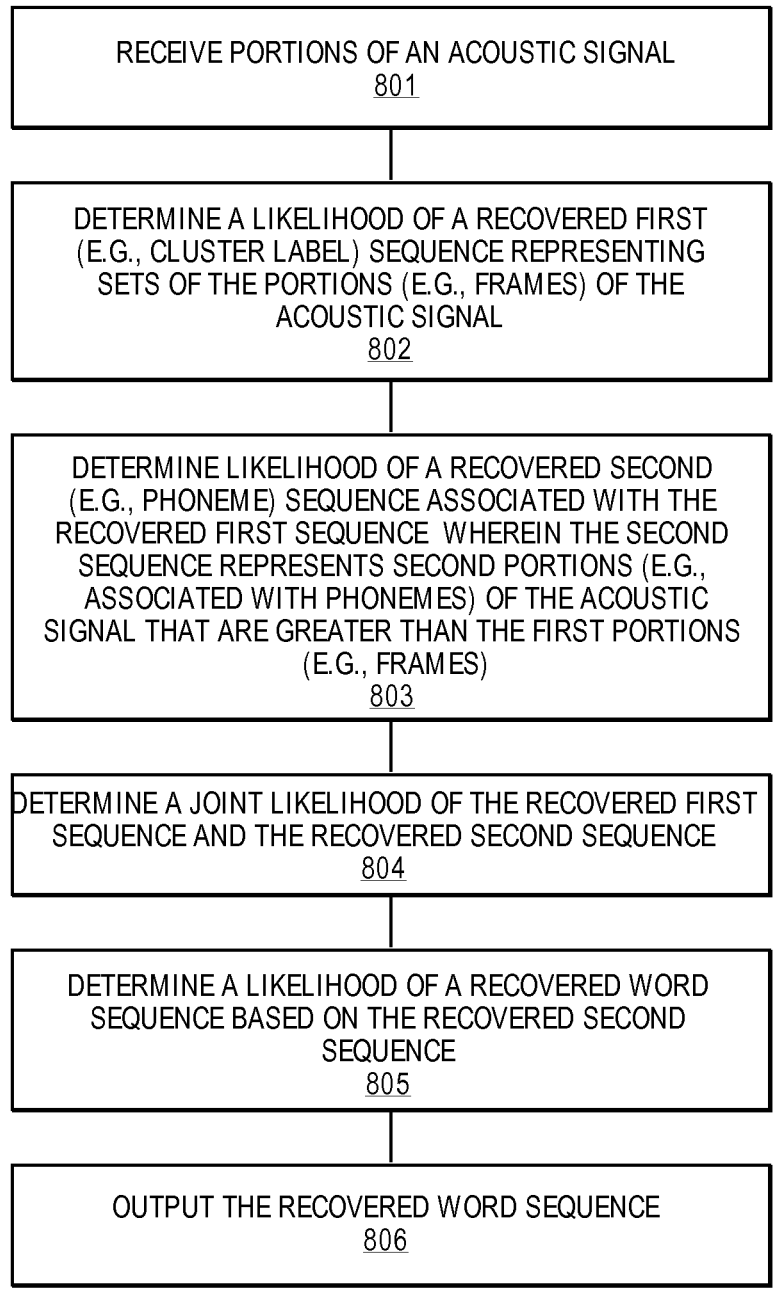
FIG. 8 is a flowchart of one embodiment of a method to recover a word sequence.

FIG. 8 is a flowchart of one embodiment of a method to recover a word sequence. Method 800 begins with operation 801 involving receiving portions of an acoustic signal. In one embodiment, the portions of the acoustic signal are associated with frames. At operation 802 a likelihood of a recovered first parameter sequence representing the first portions of the acoustic signal is determined. The likelihood of the recovered first parameter sequence may be determined based on observed first parameter sequence. In one embodiment, the likelihood of the recovered first parameter sequence is determined based on a distortion model for the first parameters. For example, the likelihood of a recovered cluster label sequence representing sets of frames of the acoustic signal can be computed based on applying a detailed distortion model to the observed cluster label sequence associated with an acoustic evidence. For example, a word sequence "did you" may be realized with a "D" followed by a "y", or it may be realized with a "D" followed by a "J". That may result into two slightly different cluster label sequences distorted from a cluster label sequence associated with the observed acoustic evidence. The detailed distortion model for the cluster labels can be applied to the observed acoustic evidence to determine the recovered cluster label sequence, as described in further detail below.

At operation 803 a likelihood of a recovered second parameter sequence associated with the recovered first parameter sequence is determined, wherein the second parameter sequence represents second portions of the acoustic signal that are greater in time than the first portions. The likelihood of the recovered second parameter sequence may be determined based on an observed second parameter sequence. For example, the likelihood of a recovered phoneme sequence associated with the recovered cluster label sequence can be computed based on applying a coarse distortion model to the observed phoneme sequence, as described in further detail below. In one embodiment, the durations of the portions of the acoustic signal associated with the cluster labels are smaller than the durations of the portions of the acoustic signal associated with phonemes, as described above.

In one embodiment, determining the likelihood of the recovered second parameter sequence includes mapping the recovered first parameter sequence to the recovered second parameter sequence. For example, determining the likelihood of the recovered phoneme sequence includes mapping the recovered cluster label sequence to the recovered phoneme sequence, as described in further detail below.

In one embodiment, the recovered second parameter sequence includes a discrete parameter representation of the acoustic signal; and the recovered first parameter sequence includes a continuous parameter representation of residuals of the acoustic signal. In one embodiment, the recovered phoneme sequence includes a representation of the acoustic signal by discrete phoneme parameters, and the recovered cluster label sequence includes a representation of the acoustic signal by discrete cluster label parameters and a representation of residuals of the acoustic signal by a reduced set of continuous parameters, as described in further detail below.

In one embodiment, a likelihood of a continuous parameter representation of the residuals of the acoustic signal is determined based on the observed first parameter sequence. For example, a likelihood of a continuous parameter representation of the residual variations of the frames of the acoustic signal can be computed based on an observed cluster label sequence, as described in further detail below.

At operation 804 a joint likelihood of the recovered first parameter sequence and the recovered second parameter sequence is determined. For example, the joint likelihood of the recovered cluster label sequence and the recovered phoneme sequence can be computed using a perception model, as described in further detail below. At operation 805 a likelihood of a recovered word sequence is determined based on the recovered second parameter sequence. For example, the likelihood of a recovered word sequence can be computed based on the recovered phoneme sequence, as described in further detail below. At operation 806 a recovered word sequence can be provided to an output device, e.g., a display, printer, and the like.

FIG. 9 is a flowchart of one embodiment of a method 900 to provide an intermediate representation of an input acoustic signal. At operation 901 portions of the acoustic signal are represented by cluster labels. In one embodiment, a cluster label represents a portion of the acoustic signal that is longer than duration of a frame, and shorter than the duration of a phoneme associated with the acoustic evidence. In one embodiment, each cluster label represents a set of frames of the acoustic signal.

Figure 11:
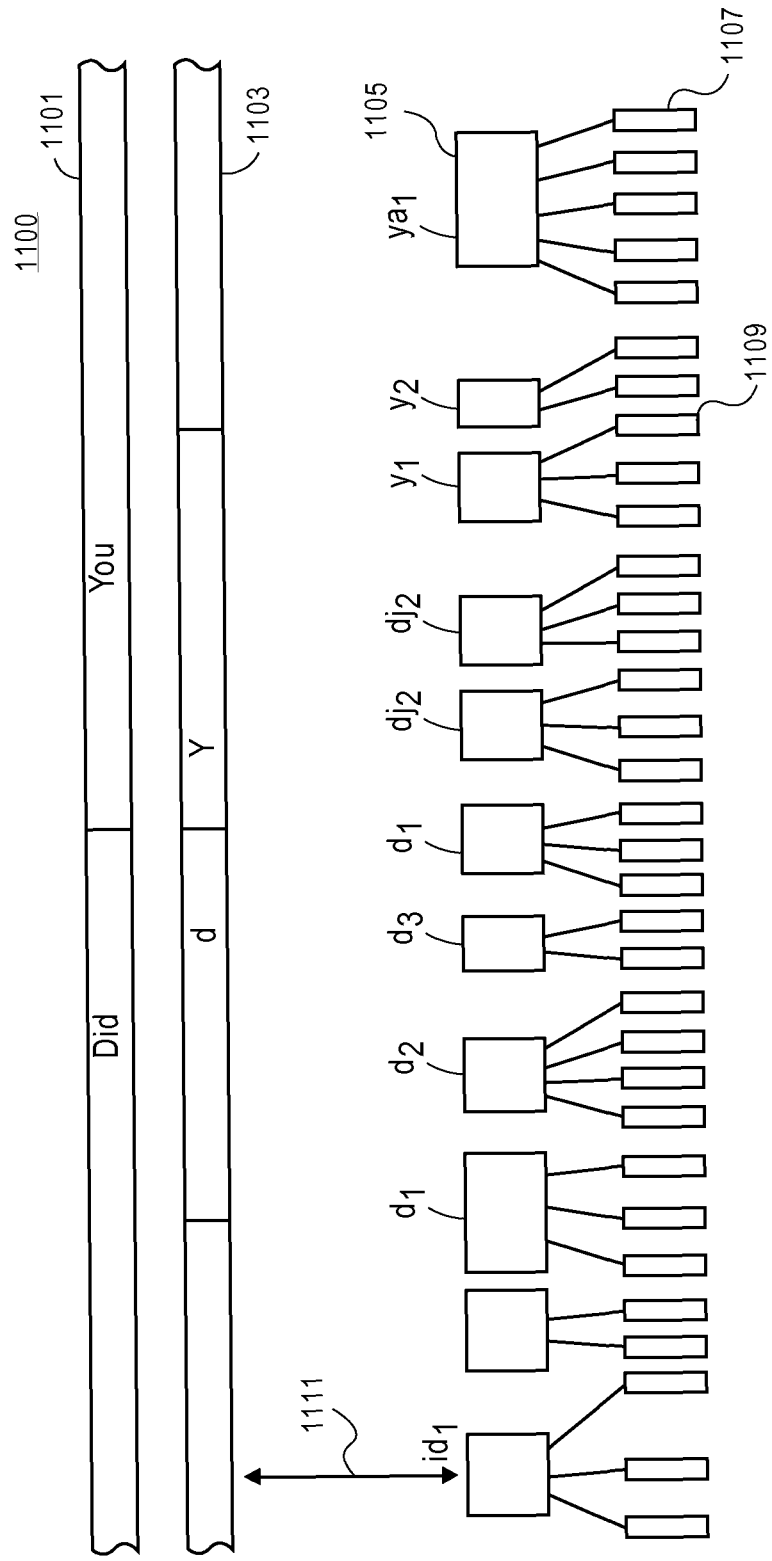
FIG. 11 is a diagram illustrating one embodiment of providing a coarse discrete layer and a detailed discrete layer representing an acoustic signal.

FIG. 11 is a diagram illustrating one embodiment of providing a coarse discrete layer and a detailed discrete layer representing an acoustic signal. Diagram 1100 includes a word layer containing words 1101 (e.g. "Did you"), a phoneme layer containing phonemes 1103 (e.g., "d" and "y"), a cluster label layer having cluster labels 1105 (e.g., $d_1$, $d_1$, $d_2$, $d_3$ ... $d_1$, $d_{j2}$, $d_{j3}$, $y_1$, $y_2$, $ya_1$). As shown in FIG. 11, each cluster label represents a set of frames 1107 of the acoustic signal. Each frame of the acoustic signal, e.g., frame 1109, can be described by a set of feature vector parameters, e.g., MFCCs. Each frame of the acoustic signal may have in one embodiment, a duration of about 10 ms. A number of frames represented by each cluster label can vary depending on an acoustic sequence. For example, as shown in FIG. 11, cluster label "$ya_1$" may represent 5 frames, cluster label "$y_2$" may represent 2 frames, cluster label "$y_1$" may represent 3 frames. That is, millions of frames of the acoustic sequence may be clustered into about 500-2000 clusters.

In one embodiment, each of the cluster label layer 1105 and phoneme layer 1103 is a discrete parameter layer. Cluster label layer 1105 containing, for example, 500-2000 clusters of frames can describe the acoustic sequence in more detail than phoneme layer 1103 containing, for example, about 40-100 phonemes.

As shown in FIG. 11, cluster label layer 1105 is an intermediate discrete parameter layer between the phoneme layer 1103 and frames 1107 of the acoustic signal. In one embodiment, cluster label layer 1105 and phoneme layer 1103 are trained independently from each other. For example, cluster label layer 1105 is trained based on a set of data that is different from the set of data that is fed to train the phoneme layer 1103. As shown in FIG. 11, the cluster label layer 1105 can be coupled to the phoneme layer 1103 by using a latent perception mapping 1111. That is, the system does not have a priori idea how many cluster labels to assign to a phoneme. In one embodiment, mapping from a phoneme layer 1103 to cluster label layer 1105 is performed to determine how many cluster labels are to assign to a phoneme, as described in further detail below.

Figure 12:
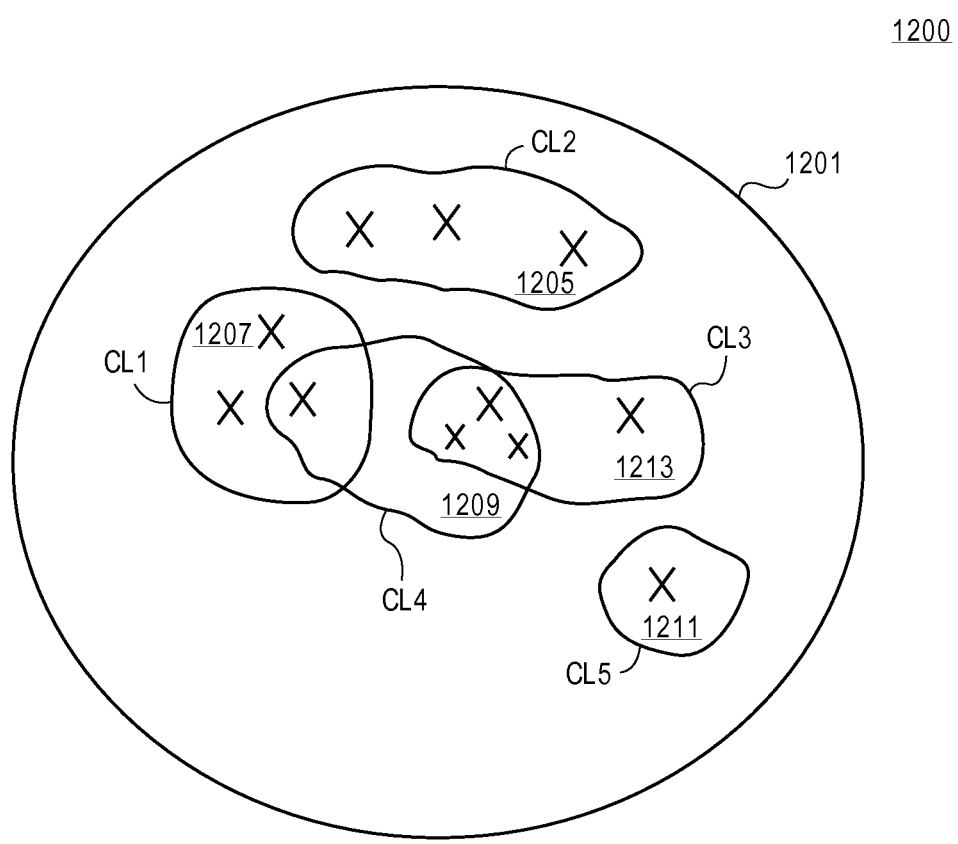
FIG. 12 shows a diagram of one embodiment of clustering frames into sets of frames attached to cluster labels.

FIG. 12 shows a diagram of one embodiment of clustering frames into sets of frames attached to cluster labels. As shown in FIG. 12, two dimensional projection of a feature vector space 1201 contains vectors, such as a vector 1203, describing the frames of the acoustic sequence. As shown in FIG. 12, regions 1205, 1207, 1209, 1211, and 1213 associated with sets of frames are attached to cluster labels CL1, CL2, CL3, CL4, and CL5 respectively. A region of feature vector space 1201 represented by a cluster label can vary depending on a realization of the acoustic sequence. For example, cluster label CL1 may represent region 1207 associated with 3 frames, cluster label CL5 may represent region 1211 associated with one frame, and cluster label CL4 may represent region 1209 associated with frames from regions 1207 and 1213.

Referring back to FIG. 9, method 900 continues with operation 902 that involves determining a portion of the acoustic signal associated with a cluster label. For example, a mean (e.g., average) frame of the set of frames associated with a cluster label can be computed. At operation 903 residuals for each of the portions of the acoustic signal can be computed based on the portion associated with each cluster label. For example, residual variations of the frames of the acoustic signal can be computed by subtracting a mean frame associated with a cluster label from each frame of the set of frames. At operation 904, the residuals of the portions of the acoustic signal are represented by a reduced set of continuous parameters (e.g., model parameters, such as Gaussian distributions, and the like). For example, the residual variations of the frames ("residual frames") of the acoustic signal can be represented (e.g., modeled) by a reduced set of Gaussian distributions to minimize the loss of information associated with discrete parameterization of the acoustic signal. That is, the continuous representation of the residuals of the acoustic signal can be determined based on the discrete parameters describing the acoustic signal (e.g., cluster labels). More specifically, a cluster label is used for discrete modeling and the average frame of the cluster of frames is used to compute the residuals of the acoustic signal.

In one embodiment, the discrete cluster label representation is closer to the perception of the waveform of the acoustic signal than the phoneme representation, because it takes into account a predictable variability associated with a context of the word sentence and inherently encodes some of variability in duration when a word sentence is produced. In one embodiment, the predictable variability and duration of the acoustic signal are described by a discrete parameter modeling while residual variations of the acoustic signal are described with a continuous parameter modeling using, for example, HMMs.

Figure 13:
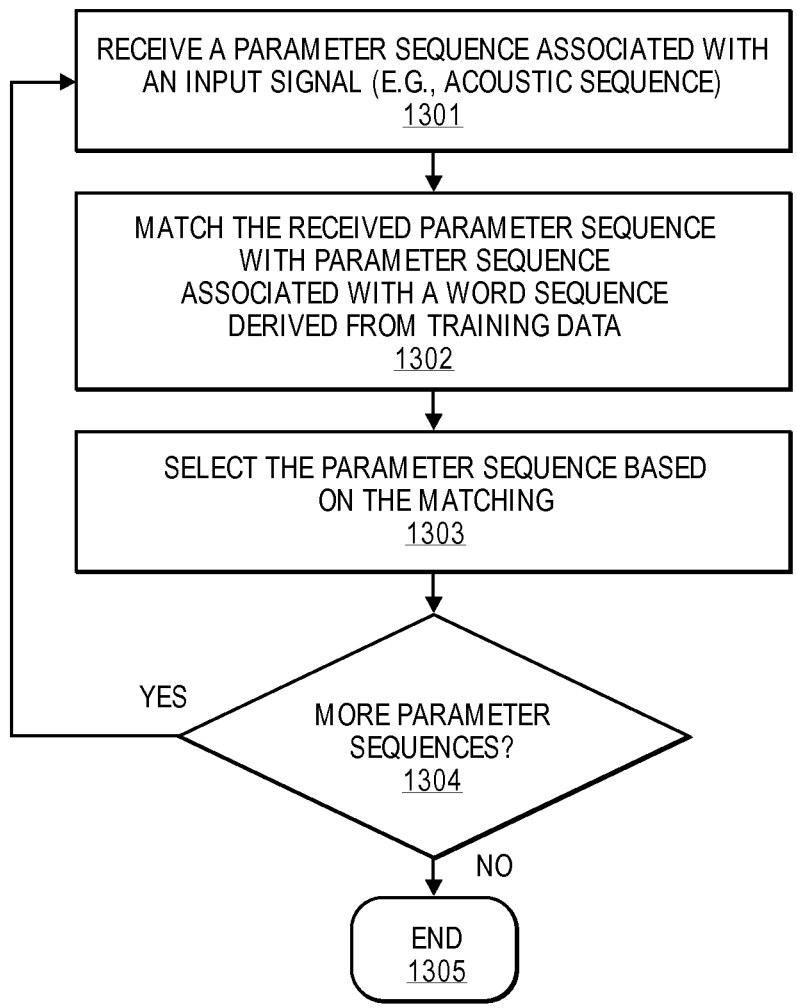
FIG. 13 is a flowchart of one embodiment of a method of determining a likelihood of a parameter sequence recovered from an observed acoustic evidence.

FIG. 13 is a flowchart of one embodiment of a method to determine a likelihood of a parameter sequence recovered from an observed acoustic evidence. In one embodiment, the likelihood of the recovered second parameter sequence is determined using a distortion model. Method 1300 begins with operation 1301 involving receiving a recovered parameter sequence associated with an input signal. The input signal may be, e.g., an observed acoustic evidence. In one embodiment, the recovered parameter sequence is a cluster label sequence associated with an acoustic sequence.

In another embodiment, the recovered parameter sequence is a phoneme sequence associated with an acoustic sequence. At operation 1302 the recovered parameter sequence is matched with a parameter sequence associated with a word sequence derived from training data. In one embodiment, the recovered cluster label sequence is matched with a cluster label sequence derived from the cluster label training data corpus.

In another embodiment, the recovered phoneme sequence is matched with a phoneme sequence associated with a word sequence derived from the phoneme training data corpus. At operation 1303 the parameter sequence is selected based on the matching. At operation 1304 it is determined whether there are more recovered parameter sequences to receive. If there are more recovered parameter sequences to receive, method 1300 returns to operation 1301. If there are no more parameter sequences to receive, method 1300 ends.

Formulation

The following discussion provides an example of an embodiment expressed mathematically.

As a preamble, note that on the production side both word-to-phoneme and phoneme-to-cluster label conversions are deterministic for a given intended word sequence and a given codebook design. In other words:

$$Pr(C, P|W) = \begin{cases} 1, & \text{if } P = P_w \text{ and } C = C_w \\ 0, & \text{otherwise} \end{cases} \quad (3)$$

where PW and CW refer to the (unique) phoneme and cluster label sequences associated with the intended word sequence W (assuming sufficient context to disambiguate between occasional oddities like, say, the present tense and past tense forms of "read").

Using this identity and elementary probability theory, the first factor in (2) can then be expanded as:

$$Pr(A|W) = \sum_Q \sum_D \sum_P \sum_C Pr(A, D, Q, C, P | W) \quad (4)$$

$$= \sum_Q \sum_D \sum_P \sum_C Pr(A, D, Q | C, P, W) Pr(C, P | W) \quad (5)$$

$$= \sum_Q \sum_D Pr(A, D, Q | C_w, P_w, W) \quad (6)$$

$$= \sum_Q \sum_D Pr(A, D, Q | C_w, P_w) \quad (7)$$

where the summations over Q, D, P, and C range over all of the possible respective sequences that can be generated in the language, the transition from (5) to (6) follows trivially from (3), and the last equality reflects the fact that conditioning on the word sequence is essentially redundant given knowledge of the (ideal) sub-word sequences PW and CW.

Continuing to expand Pr(A,D,Q|CW, PW), we can further write:

$$Pr(A,D,Q|C_w,P_w) = Pr(A|D,Q,C_w,P_w)Pr(D,Q|C_w,P_w) \quad (8)$$

$$= Pr(A|D, Q, C_w, P_w) \frac{Pr(D, Q, C_w | P_w)}{Pr(C_w | P_w)} \quad (9)$$

$$= Pr(A|D, Q, C_w, P_w) \frac{Pr(D | C_w, Q, P_w)}{Pr(C_w | Q, P_w)} \frac{Pr(Q | P_w)}{Pr(C_w P_w)} \quad (10)$$

$$= Pr(A|D, Q, C_w, P_w) Pr(D|C_w, Q, P_w) \frac{PR(C_w, P_w | Q)}{Pr(C_w, P_w)} Pr(Q|P_w) \quad (11)$$

It is worth remarking that, so far, no approximation has been involved in the above derivation. In order to keep the problem tractable, however, at this point we can invoke some assumptions. We will go through three approximations in turn and discuss why they might be justified.

The first approximation is:

$$Pr(A|D, Q, CW, PW) \approx Pr(A|D, CW) \quad (12)$$

$$\approx Pr(A|CW), \quad (13)$$

where (12) simply reflects the decoupling between the two kinds of parameterizations that we have postulated earlier, making the acoustic realization dependent only on the detailed layer of representation, and (13) underscores the likely precedence of the intended over the recognized sequence when it comes to acoustic realization. This reasoning is in line with the type of acoustic modeling assumptions typically made at the word level.

The second approximation is similarly linked to the decoupling invoked earlier:

$$Pr(D|CW,Q,PW) \approx Pr(D|CW). \quad (14)$$

With this assumption, we argue that the recognized label sequence is likely to depend more on its intended version than on what happens at the phoneme level, which implies that distortions introduced at one level are independent from distortions introduced at the other. This may not be strictly true, since labels will typically be constrained by phonemes, but can be relatively reasonable under a scenario where training of the two models is sufficiently decoupled.

The third approximation allows us to quantify the amount of coupling remaining. Clearly, if the two levels were indeed independent, then Pr(CW, PW|Q) would reduce to Pr(CW, PW) in (11), and the numerator and denominator would both simplify to the product Pr(CW)Pr(PW). In general this is not the case, however, which means that these terms do not cancel out. We capture this coupling through a parameter δ defined as:

$$Pr(CW,PW|Q) \approx [Pr(CW,PW)]^{1+\delta}, \quad (15)$$

where δ=0 corresponds to independence, and increasing departure from zero reflects a greater coupling between the two levels of description. The value of δ is normally set using empirical observation. That is, the coupling between the cluster label layer and a phoneme layer can be data driven and controlled through value of δ.

In addition to (13)-(15), we can also invoke the Viterbi approximation, as is commonly done in order to turn summations into maximums in expressions like (7). With these simplifying assumptions, (2), together with (7) and (11), can be expanded as:

$$\hat{W} = \arg \max_W \max_Q \max_D Pr(A|C_W)Pr(D|C_W)[Pr(C_W, P_W)]^{\delta} Pr(Q|P_W) Pr(W) \quad (16)$$

$$= \arg\max Pr(A|CW) [\max_D Pr(D | C_w)][Pr(C_w, P_w)]^{\delta} [\max_Q Pr(Q | P_W)] Pr(W) \quad (17)$$

This formulation comprises five distinct factors, which we now discuss. P(W) is the same entity appearing in (2), and can be computed using a standard statistical language model such as a (word) n-gram. As for Pr(A|CW), it is structurally similar to Pr(A|W) in (2), and can in general come from the same type of HMM acoustic model. However, this acoustic model is now driven by a detailed discrete representation (rather than words), which is presumably a lot more conducive to a compact implementation (since a large fraction of the underlying variability in the production process has already been systematically codified).

The remaining three factors in the middle of (17) are a direct consequence of the problem reformulation adopted in FIG. 2. We refer to $[\max_Q \Pr(Q|P_W)]$ and $[\max_D \Pr(D|CW)]$ as distortion factors, since they reflect the errors introduced in the discrete phoneme and cluster label sequences, respectively. They can therefore be computed using separately trained phoneme and cluster label distortion models. The entity $\Pr(CW, PW)^\delta$, as mentioned before, reflects the level of coupling between the two levels of discrete description (phonemes and cluster labels). Since this coupling directly impacts how the coarse representation (phonemes) is realized as a detailed representation (cluster labels), we refer to this factor as the perception factor, computed, logically enough, using a perception model.

The formulation (17) thus suggests a novel strategy for speech recognition, which can now be performed by training an acoustic model and a language model as before, plus two distortion models and a perception model. Since the acoustic and language models are well-established, the following concentrates on the distortion and perception models.

Distortion Models

Neglecting the size of the underlying symbol alphabet, the two distortion models behave in a similar way, as in each case the goal is to compute a quantity of the form $\Pr(S|T)$. For the coarse distortion model (phonemes), training data can be generated from the application of a standard phoneme recognizer to the training corpus. Similarly for the detailed distortion model (cluster label), except that this generation now involves an expanded symbol inventory. The following considers generic training applicable to both models.

Several approaches are available for this training. One solution is to cast this task as a dynamic programming problem. Let us assume that the sequence T comprises the K symbols $\phi 1 \ldots \phi k \ldots \phi K$. In general, the recovered realization S will comprise L similar symbols $\Psi 1 \ldots \Psi l \ldots \Psi L$ where L is expected to be close, but perhaps not equal, to K. Because of the potential length mismatch, the alignment of S against T should have provisions for the existence of gaps in the alignment. Denote by $A(k,l)$ the best (minimum cost) alignment between $\phi 1 \phi 2 \ldots \phi k$ and $\Psi 1 \Psi 2 \ldots \Psi l$. If $C(k, l)$ is the cost of substituting character $\Psi l$ for character $\phi k$, $g(i, k)$ the cost of a gap $\phi i \ldots \phi k$ in the first string, and $h(j, l)$ the cost of a gap $\Psi j \ldots \Psi l$ in the second string, the basic dynamic programming recursion can be written:

$$A(k,l)=\min\{A(k-1,l-1)+C(k,l), G(k,l), H(k,l)\}, \quad (18)$$

where:

$$G(k,l)=\min\{A(i,l)+g(i,k)\}, \quad (19)$$
$$0 \leq i \leq k-1$$

$$H(k,l)=\min\{A(k,j)+h(j,l)\}, \quad (20)$$
$$0 \leq j \leq l-1$$

with initial conditions $A(k, 0)=h(0, k)$, $1 \leq k \leq K$ and $A(0, l)=g(0, l)$, $1 \leq l \leq L$.

If the gap penalties $g(\cdot)$ and $h(\cdot)$ are identical, and calibrated to equal the Euclidean distance between two phonemes that are suitably far apart, then the overall alignment cost $A(K,L)$ can be viewed as the cumulative distance between S and T trajectories in the underlying vector space. As the associated norm in turn induces an exponential distribution on the space, in order to obtain the probability $\Pr(S|T)$ it is sufficient to consider:

$$Pr(S|T) = \frac{\exp\{-A(K, L)\}}{\sum_T \exp\{-A(K, L)\}} \quad (21)$$

where the denominator acts as the appropriate normalization factor. In practice, this factor need not be computed over all possible (phoneme or cluster label) sequences, which may be impractical, but can be estimated using only the top $\Omega$ most relevant candidates, as the influence of the rest is typically too small to matter. The value of $\Omega$ is normally found via empirical observation.

Alternatively, one could adopt a CRF (Conditional Random Field) framework and model the conditional probability $\Pr(S|T)$ directly. In this case, in its simplest expression the distribution at each state $s_i$ has the form:

$$Pr\ s_i(s_i+1|t_i)=Pr(s_i+1|s_i+1,t_i), \quad (22)$$

which represent the probability of moving from state si to state si+1 on observation ti. Each state-observation transition function is usually expressed as a log-linear model:

$$Prs_i(s_i + 1|t_i) = \frac{1}{z(S,T)} \exp\left[\sum \lambda_{kf} f_k(s_{i+1}, t_i)\right] \quad (23)$$

where $f_k(\cdot, \cdot)$ is a feature function of the current observation and a potential next state, $\lambda_k$ is a parameter to be estimated, and $Z(S, T)$ is a normalization factor. Each feature function expresses some characteristic of the empirical training distribution, which is deemed important to require of the trained model as well. The difficulty, of course, is to come up with satisfactory feature functions. In the present situation, these feature functions would reflect observed distortions in the respective sequences under consideration.

Perception Model

Neglecting the parameter $\delta$, the goal of the perception model is to characterize the entity $\Pr(C_W, P_W)$, or, said another way, to quantify the joint probability distribution governing how the coarse representation (e.g., phonemes) is realized as a detailed representation (e.g., cluster labels). Compared to the usual approach to acoustic modeling, this is where the new formulation offers the greatest opportunity for dimensionality reduction. To leverage this opportunity, we exploit the latent semantic mapping (LSM) framework. The LSM framework was described in J. R. Bellegarda, "Latent Semantic Mapping," Signal Proc. Magazine, Special Issue Speech Technol. Syst. Human Machine Communication, L Deng, K. Wang, and W. Chou, Eds., Vol. 22, No. 5, pp. 70-80, September 2005. Hence the terminology used herein is "latent perception modeling".

Figure 14:
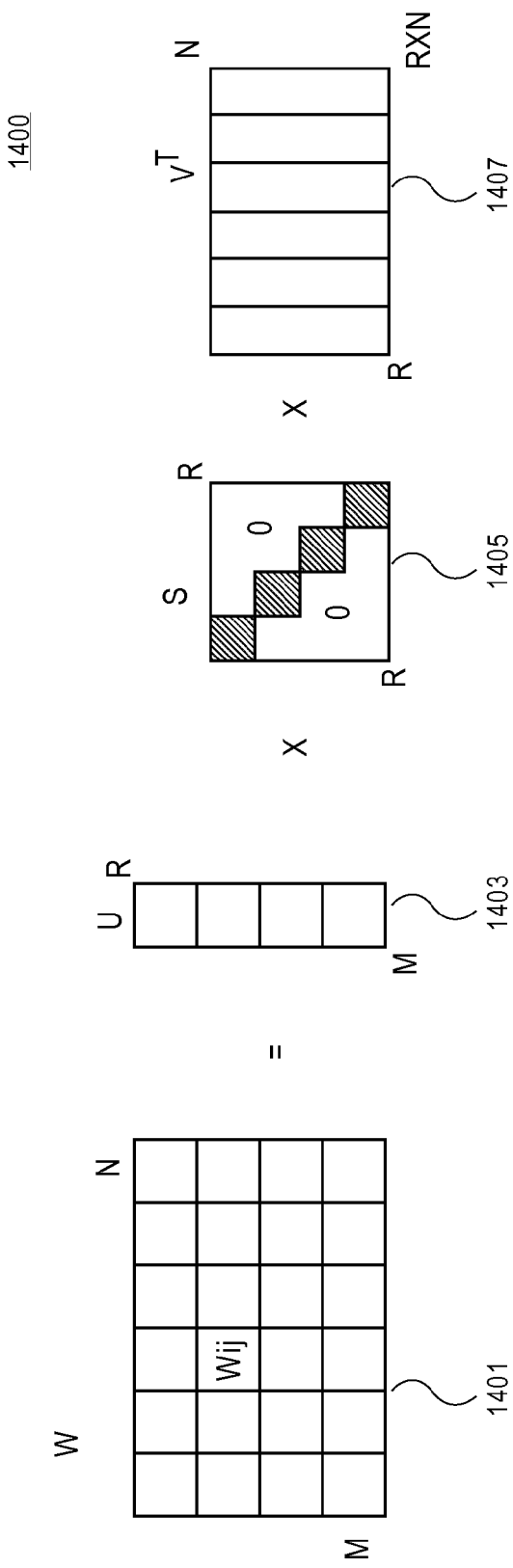
FIG. 14 shows a diagram 1400 that illustrates a singular value decomposition of a matrix W to construct a vector space.
Figure 16:
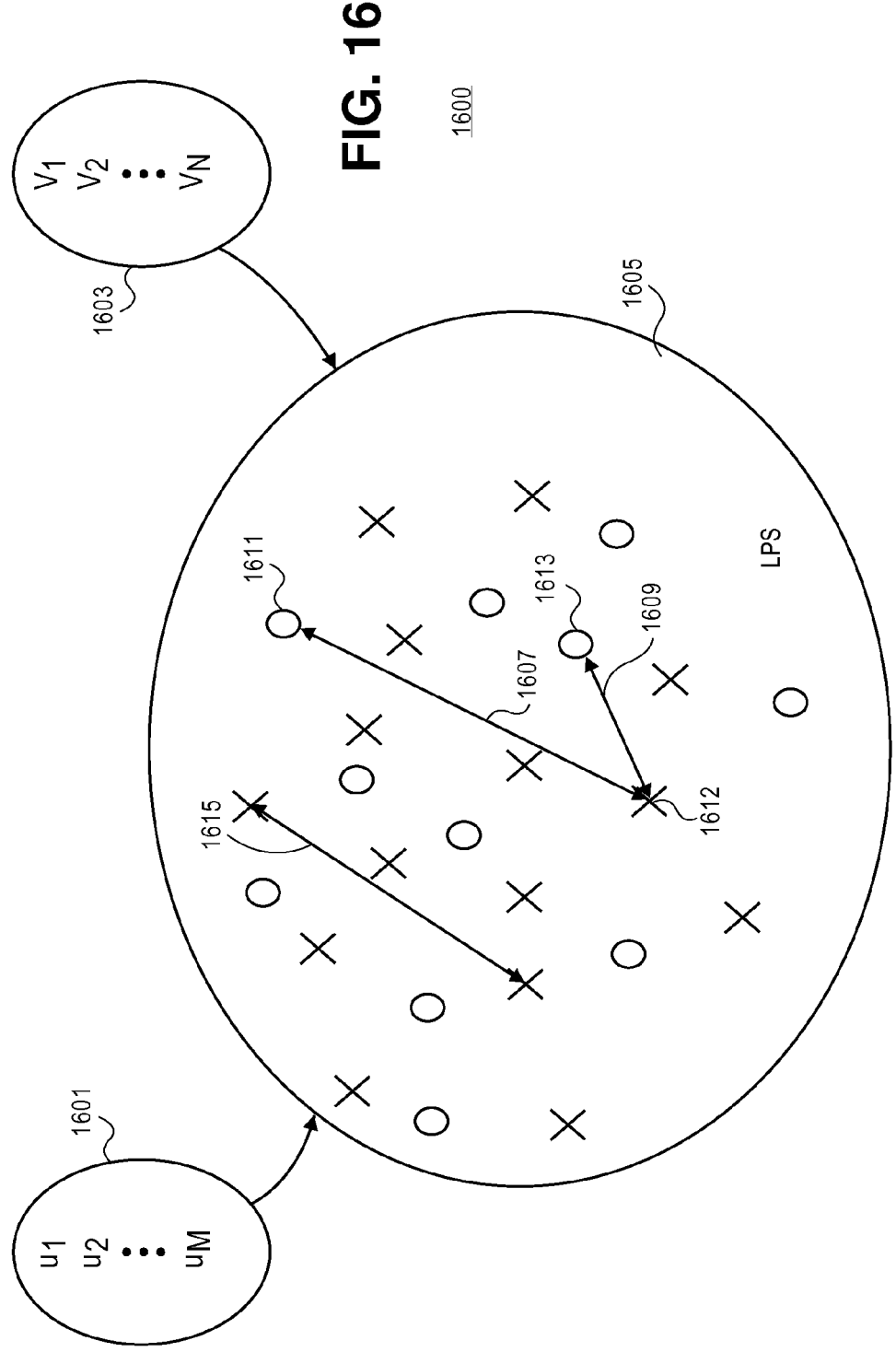
FIG. 16 shows an overview of one embodiment of a vector space to map parameters representing an input signal.

FIG. 14 shows a diagram 1400 that illustrates a singular value decomposition of a matrix W to construct a vector space, such as vector space 1605 depicted in FIG. 16 according to one embodiment of invention. Let M, |M|=M, and N, |N|=N, denote the set of distinct phonemes and cluster labels, respectively. From the training data, we first construct an (M×N) phoneme-label matrix W 1401 where each entry $w_{ij}$ corresponds to the number of times label j was seen in phoneme i. We then proceed to perform a singular value decomposition ("SVD") of W as follows:

$$W \approx \tilde{W} = U\ S\ V^T, \quad (24)$$

where U is the (M×R) left singular matrix 1403 of vectors $u_i(1 \leq i \leq M)$, S is the (R×R) diagonal matrix 1405 of singular values, V is the (N×R) right singular matrix 1407 of vectors $v_j(1 \leq j \leq N)$, $R < M(< N)$ is the order of the decomposition, and $^T$ denotes matrix transposition. The ith vector $u_i$ can be viewed as the (scaled) representation of phoneme i in the vector space of dimension R spanned by the singular vectors. Similarly, the jth vector vj can be viewed as the (scaled) representation of label j in the same R-dimensional vector space. We refer to this space as the "latent perception space". Reasonable values of R are 10 to 20 in one embodiment, which entails a considerable dimensionality reduction compared to conventional continuous parameter modeling.

The basic idea behind (24) is that $\hat{W}$ captures the major associational structure in W and ignores higher order effects. As a result, the position of vectors in the space is determined by the overall coupling between M and N, as opposed to any particular characteristic explicitly tied to the underlying acoustic realizations (such as specific spectral features). In particular, this means that two phonemes whose realizations are acoustically confusable could still be "far apart" in that space if that is otherwise consistent with the major patterns observed in the corpus (e.g., if they involve sufficiently distinct detailed realizations). This has the important benefit of alleviating the effects of speech production artifacts.

Once the space is constructed and the various entities mapped to it, the coupling between phoneme i (mapped to $u_i S^{1/2}$) and label j (mapped to $v_j S^{1/2}$) can be characterized via the usual LSM closeness measure:

$$K(i, j) = \cos(u_i S^{1/2}, v_j S^{1/2}) = \frac{u_i S v_j^T}{\|u_i S^{1/2}\| \|v_j S^{1/2}\|}, \quad (25)$$

which is readily obtained from $\hat{W}$. In a manner similar to the one seen in the previous section, it is then possible to turn this measure into a joint probability P(i, j), and, accumulating over all phonemes in PW and cluster labels in CW, to deduce the overall quantity Pr(CW, PW). This in turn quantifies the coupling between coarse and detailed representations, given the latent perception space obtained.

Figure 15:
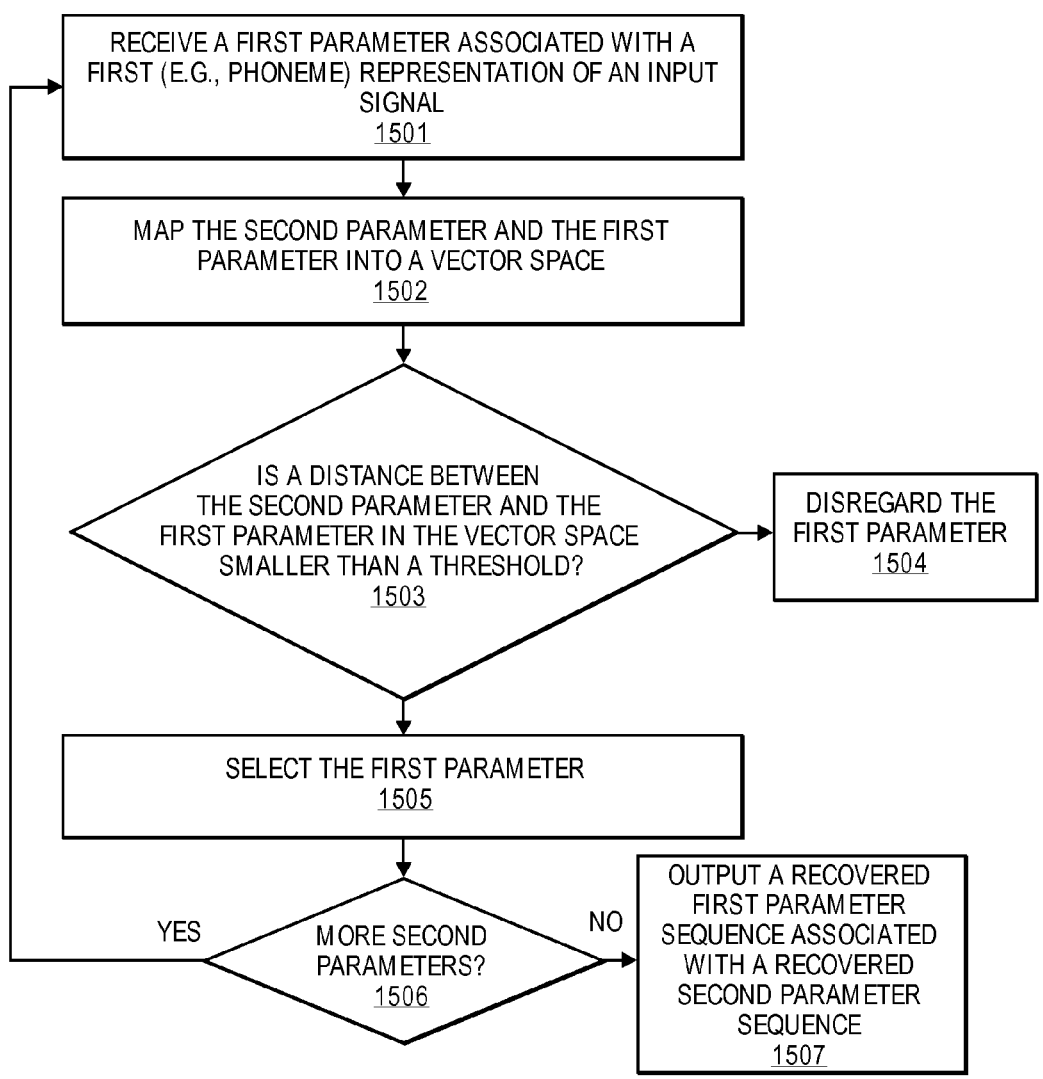
FIG. 15 is a flowchart of one embodiment of a method to recover a second parameter sequence based on a first parameter sequence associated with the input signal.

FIG. 15 is a flowchart of one embodiment of a method to recover a second parameter sequence based on a first parameter sequence associated with the input signal. Method 1500 begins with operation 1501 that involves receiving a first discrete parameter associated with a first representation of an input signal. In one embodiment, first representation is a coarse representation of the input signal. In one embodiment, the first discrete parameter is a phoneme parameter associated with an input acoustic sequence.

At operation 1502 the first parameter is mapped into a vector space having second parameters associated with a second discrete representation of an input signal. In one embodiment, the second representation includes a more detailed discrete representation of the input signal than the first representation. For example, the second parameters can be cluster labels associated with the input acoustic sequence.

FIG. 16 shows an overview 1600 of one embodiment of a vector space to map parameters representing an input signal. As shown in FIG. 16, first parameters 1601 (e.g., associated with phonemes) and second parameters 1603 (e.g., cluster labels) are mapped into a vector space 1605. In one embodiment, first parameters 1601 represent phonemes (denoted by circles in vector space 1605), and second parameters 1603 represent cluster labels (denoted by crosses in vector space 1605). In one embodiment, vector space 1605 is a latent perception space. As shown in FIG. 16, mapping of the first parameters representing phonemes and the second parameters representing cluster labels into a vector space 1605 is a global mapping.

Referring back to FIG. 15, at operation 1503 it is determined whether a distance between a second parameter and a first parameter in a vector space is smaller than a predetermined threshold. If the distance is smaller than a predetermined threshold, the first parameter is selected at operation 1506. If the distance is not smaller than the predetermined threshold, the second parameter is disregarded at operation 1505.

As shown in FIG. 15, if a distance 1607 between parameter 1611 and parameter 1612 is greater than a predetermined threshold, the parameter 1611 is disregarded. If a distance 1609 between parameter 1612 and parameter 1613 is less than a predetermined threshold, parameter 1613 is selected for a recovered second parameter sequence. For example, if a distance between a phoneme parameter and a cluster label parameter in the vector space is less than a predetermined threshold, the phoneme parameter can be selected for a recovered phoneme sequence. If a distance between the phoneme parameter and the cluster label parameter in the vector space is greater than a predetermined threshold, the phoneme parameter is disregarded in one embodiment.

Referring back to FIG. 15, at operation 1507 it is determined whether more first parameters are to be received. If there are more first parameters, the method returns to operation 1502. If there are no more first parameters, a recovered first parameter sequence associated with a recovered second parameter sequence is outputted.

To illustrate the potential benefits brought about by the latent perception approach described above, preliminary experiments using data from a subset of the "Alex" concatenative voice released as part of MacOS X Leopard were conducted. Specifically, a sequence of 107,717 phonemes drawn from a set of M=55 distinct phonemes were considered, and for this coarse sequence produced a suitable detailed representation drawn from a set of N=220 cluster labels. We then formed the associated (55×220) perception matrix W and processed it as in (24).

Figure 17:
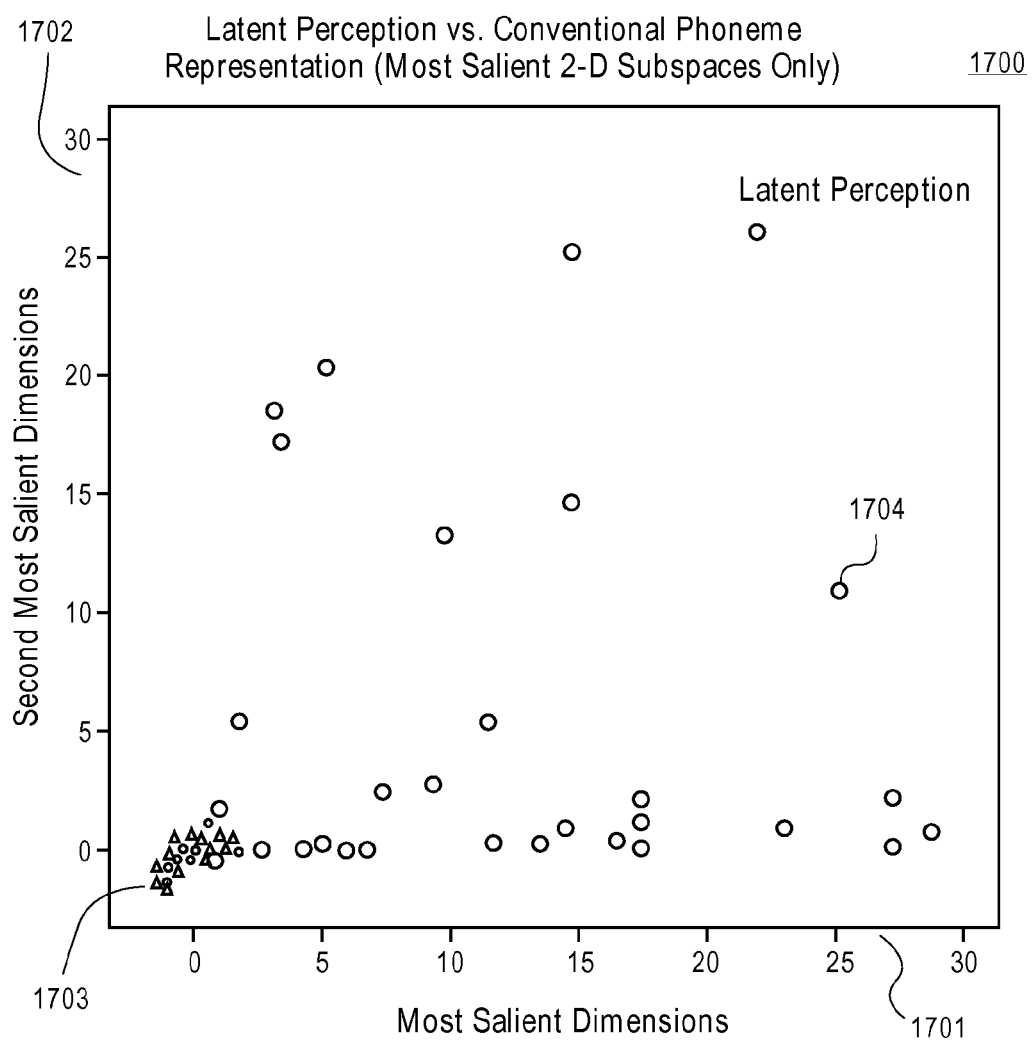
FIG. 17 illustrates one embodiment of superimposition of a latent perception subspace and a conventional 2-D subspace.

We set the dimension of the resulting latent perception space to 10, and looked at the representation of each phoneme in the 2-D subspace of this space obtained by retaining the two most salient dimensions. In parallel, we also considered the original (60-dimensional) feature space originally used to represent the acoustical realizations of the phonemes, and looked at the representation of each phoneme in the 2-D subspace of this space also obtained by retaining the two most salient dimensions. The two 2-D subspaces are superimposed in FIG. 17. Circles mark the phoneme positions after latent perception processing, while triangles mark the (original) phoneme positions obtained with conventional processing.

Everything else being equal, phonemes are much more spread out in the latent perception space than in the original space. In fact, some latent perception phonemes could not even be drawn on FIG. 17, as they fall outside the borders of the plot. In contrast, due to its reliance on features tied to acoustic realization, conventional processing yields phonemes that are seemingly more confusable with one another. This suggests a greater degree of separation in the latent perception space (e.g., a distance 1615 between two phonemes in vector space 1605 depicted in FIG. 16) that provides potentially better discrimination and higher recognition accuracy than conventional processing.

Figure 18:
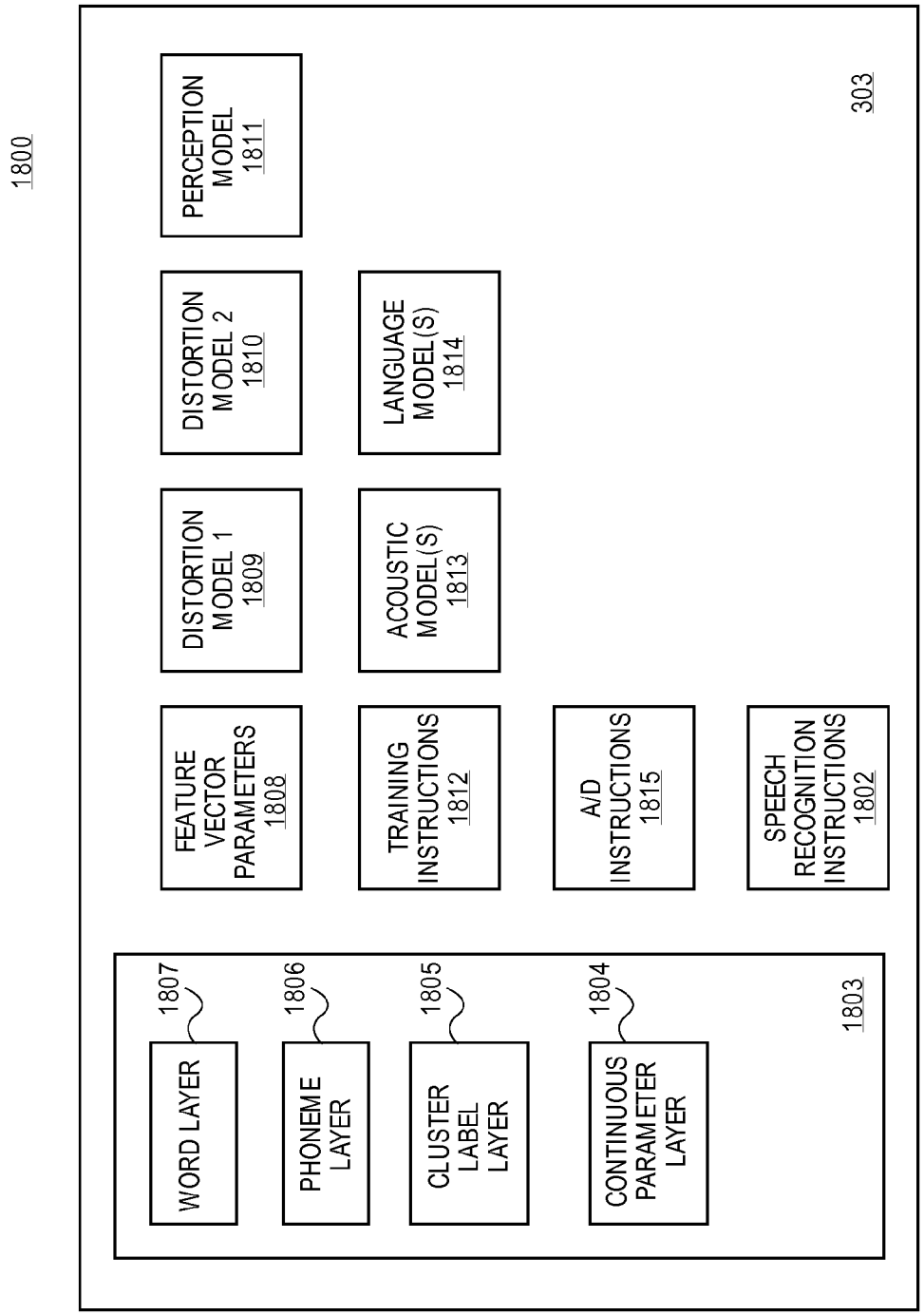
FIG. 18 shows one embodiment of a memory of a data processing system to perform automatic speech recognition.

FIG. 18 shows one embodiment 1800 of a memory of a data processing system to perform automatic speech recognition. The memory may be a memory 303 depicted in FIG. 3. As shown in FIG. 18, memory 303 includes in one embodiment training data 1803 including training data for continuous parameter layer for residuals 1804, training data for cluster label layer 1805, training data for phoneme layer 1806, and training data for a word layer 1807. Memory 1801 further includes feature vector parameters 1801, distortion models 1809 and 1810, a perception model 1811, training instructions 812, one or more acoustic models 1813, one or more language models 1814, analog-to-digital transformation instructions, and speech recognition instructions 1802. Memory may also include word agglomeration instructions (not shown), semantic classification instructions (not shown), and semantic anchors (not shown).

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine implemented method to perform speech recognition, comprising:
   receiving first portions of an acoustic signal;
   determining a likelihood of a recovered first parameter sequence representing the first portions of the acoustic signal;
   determining a likelihood of a recovered second parameter sequence associated with the recovered first parameter sequence, wherein the second parameter sequence represents second portions of the acoustic signal having a coarser granularity than the first portions;
   determining a likelihood of a recovered word sequence based on the recovered second parameter sequence; and
   outputting the recovered word sequence.

2. A machine implemented method as in claim 1, further comprising
   determining a joint likelihood of the recovered first parameter sequence and the recovered second parameter sequence.

3. A machine implemented method as in claim 1, wherein the first portions of the acoustic signal are associated with frames, and the second portions are associated with phonemes.

4. A machine implemented method as in claim 1, wherein the recovered second parameter sequence includes a discrete parameter representation of the acoustic signal; and the recovered first parameter sequence includes a continuous parameter representation of residuals of the acoustic signal.

5. A machine implemented method as in claim 1, further comprising
   representing the first portions of the acoustic signal by cluster labels, wherein a cluster label is associated with a set of the first portions;
   computing residuals of the first portions based on the cluster labels; and
   representing the residuals of the first portions by one or more continuous parameters.

6. A machine implemented method as in claim 1, further comprising
   determining a likelihood of a continuous parameter representation of the acoustic signal based on the recovered first parameter sequence.

7. A machine implemented method as in claim 1, wherein the likelihood of the recovered first parameter sequence is determined based on a first distortion model.

8. A machine implemented method as in claim 1, wherein the likelihood of the recovered second parameter sequence is determined based on a second distortion model.

9. A machine implemented method as in claim 1, wherein the determining the likelihood of the recovered first parameter sequence includes
   matching the recovered first parameter sequence with a first parameter sequence derived from training data; and
   selecting the recovered first parameter sequence based on the matching.

10. A machine implemented method as in claim 1, wherein the determining the likelihood of
    the recovered second parameter sequence includes
    mapping the recovered first parameter sequence to the recovered second parameter sequence.

11. A non-transitory machine-readable medium storing executable program instructions which when executed by a data processing system causes the system to perform operations to recognize speech, comprising:
    receiving first portions of an acoustic signal;
    determining a likelihood of a recovered first parameter sequence representing the first portions of the acoustic signal;
    determining a likelihood of a recovered second parameter sequence associated with the recovered first parameter sequence, wherein the second parameter sequence represents second portions of the acoustic signal that have a coarser granularity than the first portions;
    determining a likelihood of a recovered word sequence based on the recovered second parameter sequence; and
    outputting the recovered word sequence.

12. A non-transitory machine-readable medium as in claim 11, further comprising instructions that cause the system to perform operations comprising
    determining a joint likelihood of the recovered first parameter sequence and the recovered second parameter sequence.

13. A non-transitory machine-readable medium as in claim 11, wherein the first portions of the acoustic signal are associated with frames, and the second portions are associated with phonemes.

14. A non-transitory machine-readable medium as in claim 11, wherein the recovered second parameter sequence includes a discrete parameter representation of the acoustic signal; and the recovered first parameter sequence includes a continuous parameter representation of residuals of the acoustic signal.

15. A non-transitory machine-readable medium as in claim 11, further comprising instructions that cause the system to perform operations comprising
    representing the first portions of the acoustic signal by cluster labels, wherein a cluster label is associated with a set of the first portions;
    computing residuals of the first portions based on the cluster labels; and
    representing the residuals of the first portions by one or more continuous parameters.

16. A non-transitory machine-readable medium as in claim 11, further comprising instructions that cause the system to perform operations comprising
    determining a likelihood of a continuous parameter representation of the acoustic signal based on the recovered first parameter sequence.

17. A non-transitory machine-readable medium as in claim 11, wherein the likelihood of the recovered first parameter sequence is determined based on a first distortion model.

18. A non-transitory machine-readable medium as in claim 11, wherein the likelihood of the recovered second parameter sequence is determined based on a second distortion model.

19. A non-transitory machine-readable medium as in claim 11, wherein the determining the likelihood of the recovered first parameter sequence includes
matching the recovered first parameter sequence with a first parameter sequence derived from training data; and
selecting the recovered first parameter sequence based on the matching.

20. A non-transitory machine-readable medium as in claim 11, wherein the determining the likelihood of the recovered second parameter sequence includes
mapping the recovered first parameter sequence to the recovered second parameter sequence.

21. A data processing system to perform speech recognition, comprising:
a memory; and
a processor coupled to the memory, the processor is configured to:
receive first portions of an acoustic signal;
determine a likelihood of a recovered first parameter sequence representing the first portions of the acoustic signal;
determine a likelihood of a recovered second parameter sequence associated with the recovered first parameter sequence, wherein the second parameter sequence represents second portions of the acoustic signal that have a coarser granularity than the first portions;
determine a likelihood of a recovered word sequence based on the recovered second parameter sequence; and
output the recovered word sequence.

22. A data processing system as in claim 21, wherein the processor is further configured to determine a joint likelihood of the recovered first parameter sequence and the recovered second parameter sequence.

23. A data processing system as in claim 21, wherein the first portions of the acoustic signal are associated with frames, and the second portions are associated with phonemes.

24. A data processing system as in claim 21, wherein the recovered second parameter sequence includes a discrete parameter representation of the acoustic signal; and the recovered first parameter sequence includes a continuous parameter representation of residuals of the acoustic signal.

25. A data processing system as in claim 21, wherein the processor is further configured to represent the first portions of the acoustic signal by cluster labels, wherein a cluster label is associated with a set of the first portions; to compute residuals of the first portions based on the cluster labels; and to represent the residuals of the first portions by one or more continuous parameters.

26. A data processing system as in claim 21, wherein the processor is further configured to determine a likelihood of a continuous parameter representation of the acoustic signal based on the recovered first parameter sequence.

27. A data processing system as in claim 21, wherein the likelihood of the recovered first parameter sequence is determined based on a first distortion model.

28. A data processing system as in claim 21, wherein the likelihood of the recovered second parameter sequence is determined based on a second distortion model.

29. A data processing system as in claim 21, wherein the determining the likelihood of the recovered first parameter sequence includes
matching the recovered first parameter sequence with an a first parameter sequence derived from training data; and
selecting the recovered first parameter sequence based on the matching.

30. A data processing system as in claim 21, wherein the determining the likelihood of the recovered second parameter sequence includes
mapping the recovered first parameter sequence to the recovered second parameter sequence.

31. A data processing system to perform speech recognition, comprising: means for receiving first portions of an acoustic signal; means for determining a likelihood of a recovered first parameter sequence representing the first portions of the acoustic signal; means for determining a likelihood of a recovered second parameter sequence associated with the recovered first parameter sequence, wherein the second parameter sequence represents second portions of the acoustic signal that have a coarser granularity than the first portions; means for determining a likelihood of a recovered word sequence based on the recovered second parameter sequence; and means for outputting the recovered word sequence.

32. A non-transitory machine readable storage medium containing executable instructions which when executed cause a data processing system to perform a speech recognition method, the method comprising:
receiving an acoustic signal;
extracting features from a digitized representation of the acoustic signal;
comparing at least some of the features to a first component of an acoustic model, the first component having a discrete parameter representation;
comparing at least some of the features to a second component of the acoustic model, the second component having a continuous parameter representation which models residuals of speech signals;
determining a recognized word from the comparing of at least some of the features to the first and the second components, wherein the discrete parameter representation and the continuous parameter representation are both used to map the features to at least one cluster label which is used to determine at least one phoneme.

33. The non-transitory machine readable medium as in claim 32 wherein the discrete parameter representation and the continuous parameter representation are separately and independently trained and are coupled after training.

* * * * *